United States Patent [19]

Kawachi et al.

[11] Patent Number: 4,781,424
[45] Date of Patent: Nov. 1, 1988

[54] SINGLE MODE CHANNEL OPTICAL WAVEGUIDE WITH A STRESS-INDUCED BIREFRINGENCE CONTROL REGION

[75] Inventors: Masao Kawachi; Kaname Jinguji; Norio Takato, all of Mito; Mitsuho Yasu, Katsuta; Katsunari Okamoto, Mito, all of Japan

[73] Assignee: Nippon Telegraph and Telephone Corporation, Tokyo, Japan

[21] Appl. No.: 49,387

[22] Filed: May 13, 1987

[30] Foreign Application Priority Data

| | | | |
|---|---|---|---|
| Jul. 28, 1986 | [JP] | Japan | 61-177046 |
| Aug. 11, 1986 | [JP] | Japan | 61-188158 |
| Sep. 16, 1986 | [JP] | Japan | 61-217837 |
| Dec. 11, 1986 | [JP] | Japan | 61-295226 |
| Dec. 11, 1986 | [JP] | Japan | 61-295227 |

[51] Int. Cl.⁴ .................................. G02B 5/14
[52] U.S. Cl. ........................ 350/96.3; 350/96.33
[58] Field of Search ............ 350/96.11, 96.12, 96.13, 350/96.14, 96.30, 96.33

[56] References Cited

U.S. PATENT DOCUMENTS

| | | | |
|---|---|---|---|
| 4,179,189 | 12/1979 | Kaminow et al. | 350/96.30 X |
| 4,478,489 | 10/1984 | Blankenship et al. | 350/96.30 |
| 4,681,399 | 7/1987 | Hicks, Jr. | 350/96.30 |
| 4,695,123 | 9/1987 | Chang et al. | 350/96.29 X |

FOREIGN PATENT DOCUMENTS

| | | |
|---|---|---|
| 061901 | 10/1982 | European Pat. Off. |
| 004022 | 1/1982 | Japan |
| 155518 | 9/1982 | Japan |
| 196204 | 12/1982 | Japan |

OTHER PUBLICATIONS

Kaminors et al., "Strain Birofringence in Single-Polarization Germanosilicate Optical Fibers", Elec. Letts., vol. 15, No. 21, 10/1979, pp. 677-679.
Laser Focus, vol. 19, No. 5, May 1983, pp. 155-161, Rashleigh, "Preservation of Polarization in Single-Mode Fibers".
Electronics Letters, vol. 20, No. 25/26, 12/84, Bristow et al., "Novel Integrated Optical Polarisers Using Surface Plasma Waves and Ion-Milled Grooves in Lithium Niobate".
Optics Letters, vol. 8, No. 5, May 1983, pp. 292-294, Rashleigh et al., "Influence of the Fiber Diameter on the Stress Birefringence in High-Birefringence Fibers".
Applied Optics, vol. 19, No. 20, Oct. 1980, pp. 3423-3424, Nelson, "Photo-Elastic Waveguides in Li-TaO3 and LiNbO3".
Himeno et al., "High-Silica Single-Mode Optical Reflection Bending and Intersecting Waveguides", Electronics Letters, 1985, vol. 21, No. 20, pp. 1020-1021.
Takato et al., "Low-Loss High-Silica Single-Mode Channel Waveguides", Electronics Letters, 1986, vol. 22, No. 6, pp. 321-322.
Shibata et al., "Fabrication of Polarization-Maintaining and Absorption-Reducing Fibers", Journal of Lighwave Tech., vol. LT-1, No. 1, 1983, pp. 38-43.
Microoptics News, 1986, vol. 4, No. 2, Japan Society of Applied Physics, Optics Division, Group of Microoptics (In Japanese).

*Primary Examiner*—Gene Wan
*Attorney, Agent, or Firm*—Spencer & Frank

[57] ABSTRACT

In a single mode optical waveguide having a substrate, a cladding layer formed on the substrate, a core portion embedded in the cladding layer, and an elongated member for applying a stress to the core portion or a stress relief groove for relieving a stress from the core portion in the cladding layer along the core portion. The position, shape and material of the elongated member or the groove are determined in such a way that stress-induced birefringence produced in the core portion in accordance with a difference in thermal expansion coefficient between the substrate and the single mode optical waveguide is a desired value.

32 Claims, 23 Drawing Sheets

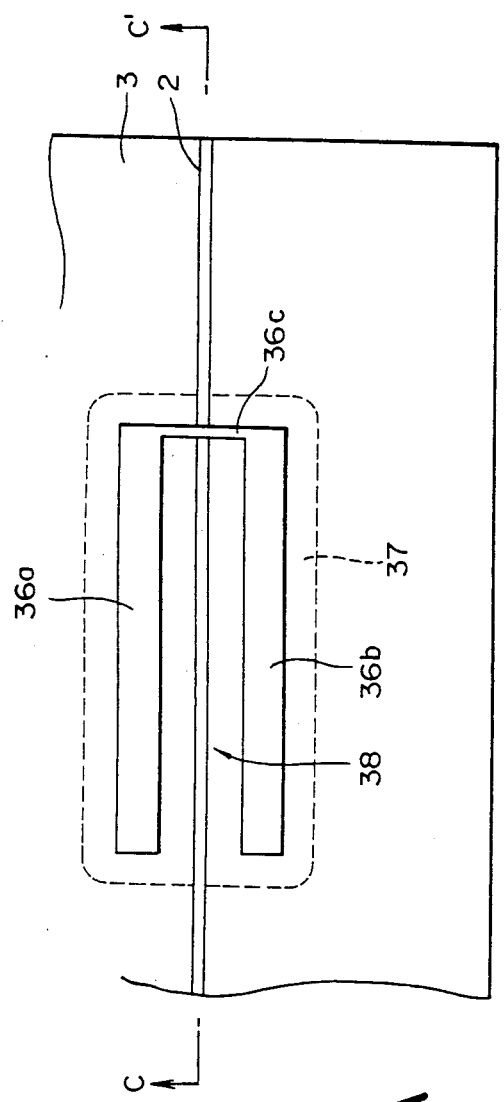
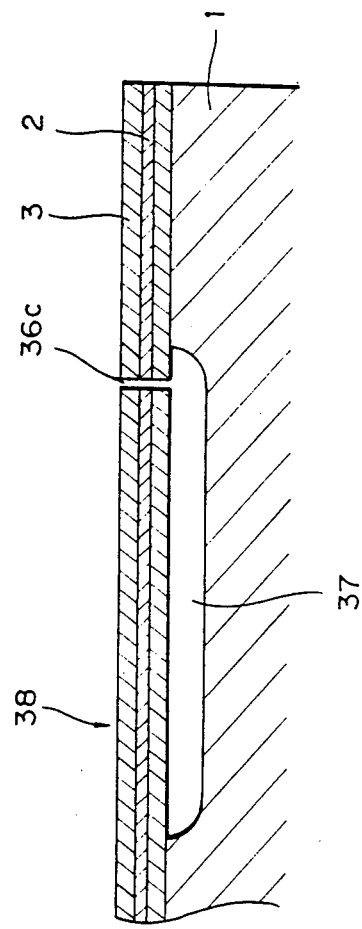
FIG. 21A
FIG. 21B

SINGLE MODE CHANNEL OPTICAL WAVEGUIDE WITH A STRESS-INDUCED BIREFRINGENCE CONTROL REGION

BACKGROUND OF THE INVENTION

1. Field of the Invention

The present invention relates to a single mode optical waveguide of the type in which a core glass portion is embedded in a cladding layer disposed on a substrate.

2. Description of the Prior Art

In a silica single mode optical waveguide which can be fabricated on a silica substrate or a silicon substrate, its cross section has a size which can be determined to be about 5–10 μm so as to correspond to that of a conventional single mode optical fiber, so that the silica single mode optical waveguide is expected as means for realizing practical waveguide type component parts having an excellent matching characteristic with an optical fiber.

The optical waveguide of the type described is disclosed in detail in Electronics Letters, 24 Oct. 1985, Vol 21, No. 20, pp. 1020–1021, "HIGH SILICA SINGLE-MODE OPTICAL REFLECTION BENDING AND INTERSECTING WAVEGUIDES" or in Electronics Letters, 13 Mar. 1986, Vol. 22, No. 6, pp. 321–322, "LOW-LOSS HIGH-SILICA SINGLE MODE CHANNEL WAVEGUIDES".

FIG. 1 is a cross sectional view showing a structure of a conventional silica single mode optical waveguide. Reference numeral 1 designates a silica glass substrate; 2, a silica glass core portion and 3, a silica glass cladding layer surrounding the core portion 2. The cross sectional size of the core portion is about 10 μm. The thickness of the cladding layer 3 is tens of micrometers. The thickness of the substrate 1 is of the order of 2 mm. Such silica single mode optical waveguide can be fabricated by a combination of deposition technique for depositing a glass film by flame hydrolysis of raw material gases such as $SiCl_4$, $TiCl_4$ or the like with reactive ion etching technique. For instance, reference is made to MICROOPTICS NEWS, 1986, 4/15, Vol. 4, No. 2, pp. 33(108)–38(113), "Microlithograpy of High-Silica Channel Optical Waveguides".

In the silica single mode optical waveguide of the type shown in FIG. 1, tensile stresses are imparted to the inside of the film surface of the cladding layer 3 because of the difference in thermal expansion coefficient between the cladding layer 3 and the silica glass substrate 1. That is, it exhibits stress-induced birefringence and, in general, the value of stress-induced birefringence B is of the order of $10^{-5}$.

The birefringence in an optical waveguide is one of the important factors which determines performance of a waveguide type optical component part, so that it is desirable to control the a birefringence value with a high degree of accuracy. However, in a conventional silica single mode waveguide, there is no way to vary or control the birefringence value except to change glass compositions or the kinds of substrate. In addition, the directions of the principal axes of stress are limited to the direction in parallel with the surface of the substrate and to the direction perpendicular thereto. In addition, it is difficult to vary locally the birefringence properties in the optical waveguides. Therefore, these problems constitute obstacles in case of fabricating a waveguide type optical component which exhibits a high degree of performance.

In some case, instead of silica glass, silicon is used as the substrate 1. In this case, the cross sectional size of the core portion 2 is also about 10 μm. The thickness of the cladding layer 3 is of the order of 50 μm. The thickness of the silicon substrate is of the order of 0.4 through 1 mm.

In the case of a silica single mode optical waveguide fabricated on a silicon substrate, a strong compression stress of the order of 15 kg/mm$^2$ is applied to the interior of the glass film surface due to the difference in thermal expansion coefficient between the silica glass and the silicon substrate, so that the optical waveguide exhibits stress-induced birefringence. Birefringence of an optical waveguide is one of the important factors which determine performance of a waveguide type optical component part. Therefore, it is desired that the birefringence be controlled with a high degree of accuracy. In general, the value of birefringence is of the order of $10^{-4}$, so that it is difficult to remove the adverse effects of stress from the silicon substrate. This problem also constitutes an obstacle in the case of fabrication of a waveguide type optical component.

Furthermore, in the case of a structure as shown in FIG. 1, in which a core portion 2 constituting a main body of an optical waveguide is placed in intimate contact with a silicon substrate 1 via a cladding layer 3, it is completely impossible to mechanically move the main body of the optical waveguide on the substrate. This problem also constitutes an obstacle when a variety of functions can be realized by an optical waveguide.

Meanwhile, as to the structure of optical fibers, there is disclosed in, for instance, Journal of Lightwave Technology, Vol. LT-1, No. 1, March 1983, pp. 38–43, "Fabrication of Polarization-Maintaining and Absorption-Reducing Fibers", an optical fiber which maintains its polarization properties by providing a stress applying portion surrounding a core portion in a cladding layer. In the optical fiber, however, it is impossible to locally adjust the stress in the longitudinal direction of the waveguide.

In an optical circuit disclosed in Laid-Open Japanese Patent Application No. 196,204/1982, stress birefringence is adjusted by varying the width of a ridge in a YIG optical waveguide (ridge type) on a GGG substrate to coincide the transmission phase constant of a TE wave with that of a TM wave. If, however, the ridge width is varied, the structure of the core portion is varied, so that the spot size of the transmitted light is the also varied. That is, birefringence cannot be adjusted independently of the core structure.

Laid-Open Japanese Patent Application No. 4,022/1982 discloses a method for producing stress-induced birefringence in a ridge type optical waveguide by loading a dielectric film ($SiO_2$ film) on a ridge type YIG optical waveguide. If, however, the dielectric film is loaded on the ridge type optical waveguide, not only the stress-induced birefringence but also the structure of the core portion itself are considerably varied. Therefore, as in the case of Laid-Open Japanese Patent Application No. 196,204/1982, the birefringence cannot be adjusted independently of the structure of the core portion.

SUMMARY OF THE INVENTION

In view of the above, it is an object of the present invention to provide a silica single mode optical waveguide which overcomes the above-described obstacles and restrictions to control birefringence more flexibly.

It is another object of the present invention to provide a silica single mode optical waveguide in which polarization properties can be locally controlled along the optical waveguide.

It is a further object of the present invention to provide a silica single mode optical waveguide which overcomes the above-described obstacles and restrictions due to a silicon substrate so that birefringence can be locally removed.

It is still a further object of the present invention to provide a silica optical waveguide fabricated on a silicon substrate in such a way that a portion of the optical waveguide can be locally displaced with respect to the silicon substrate, so that the optical waveguide can realize various functions as described above.

It is yet a further object of the present invention to provide an optical waveguide in which birefringence can be adjusted by adjusting a stress to be applied to the optical waveguide.

It is yet still a further object of the present invention to provide an optical waveguide in which a stress adjusting portion is provided in a portion of a cladding layer independently of the structure of a core portion.

In the first aspect of the present invention, a silica optical waveguide comprises:
a substrate;
a cladding layer formed on the substrate;
a silica glass core portion formed in the cladding layer; and
stress adjusting means provided in the cladding layer in the vicinity of the core portion for adjusting a stress applied to the core portion to adjust stress-induced birefringence in the core portion.

Here, the stress adjusting means may comprise a member which applies a stress to the core portion.

The member may be an elongated member which is embedded in the cladding layer and may be composed of a material having a thermal expansion coefficient different from that of the cladding layer.

The material may be selected from the group consisting of silicon, silicon nitride and $B_2O_3$ doped silica glass.

The substrate may be composed of silica or silicon.

The stress adjusting means may be a groove for relieving the stress.

The groove may be defined only in the cladding layer.

The groove may have such a depth that the bottom of the groove reaches the inside of the major surface of the substrate.

A portion of the optical waveguide constituted by the core portion which is surrounded by the cladding layer may be separated from the major surface of the substrate.

A portion of the cladding layer corresponding to one portion of the optical waveguide may be removed to form at least one pair of grooves and a portion of the silica substrate corresponding t the portion of the optical waveguide may be removed to form a recess communicating with the at least one pair of grooves.

A plurality of pairs of groove may be provided through bridge structures in the recess in the longitudinal direction of the core portion.

A portion of the cladding layer corresponding to one portion of the optical waveguide may be removed to form a plurality of grooves in the longitudinal direction of the core portion and a portion of the silicon substrate corresponding to the portion of the optical waveguide may be removed to form a plurality of recesses which communicate with the plurality of pairs of groove, respectively, in the longitudinal direction of the core portion.

A portion of the portion of the optical waveguide corresponding to one end of the at least one pair of grooves may be cut out to form a separation groove communicating with the recess and the at least one pair of grooves.

The substrate may be a silicon substrate and the recess may be formed by a selective etching process through the at least one pair of grooves.

In the second aspect of the present invention, a waveguide type Mach-Zehnder interferometer comprises:
two optical couplers;
two optical waveguides having different lengths and exhibiting stress-induced birefringence, the two optical waveguides coupling the two optical couplers, respectively;
stress relief grooves disposed along and on both sides of at least one optical waveguide in such a way that a difference in values obtained by line integration of a birefringence value with respect to each of the at least one optical waveguide between the two optical couplers is substantially equal to an integer multiple of the wavelength of light used.

Here, each of the optical waveguides may be a single mode optical waveguide comprising a silicon substrate, a silica cladding layer disposed on the silicon substrate and a core portion embedded in the cladding layer and the stress relief groove may be provided along the core portion.

A phase shifter for varying the effective optical path length of one of the two optical waveguides may be disposed on one of the two optical waveguides.

The phase shifter may comprise a thin film heater.

The phase shifter and the stress relief grooves may be disposed along the same or different optical waveguides.

In the third aspect of the present invention, a waveguide type optical phase plate comprises:
a single mode optical waveguide having a substrate, a cladding layer formed on the substrate and a core portion embedded in the cladding layer; and
at least one stress adjusting member disposed along the core portion by a predetermined length in at least one portion of the cladding layer in such a way that the principal axes of birefringence of the optical waveguide are inclined with respect to the direction perpendicular to or in parallel with the major surface of the substrate.

Here, the stress adjusting member may be a stress relief groove.

The substrate may be a silicon substrate and the single mode optical waveguide may be a silica single mode optical waveguide.

A plurality of stress relief grooves may be sequentially disposed along the core portion and alternately on both sides of the core portion.

The spacing between the stress relief groove and the core portion may be varied in the longitudinal direction of the core portion.

The depth of the stress relief groove may be equal to or smaller than the thickness of the cladding layer The above and other objects, effects, features and advantages of the present invention will become more apparent from the following description of preferred embodiments thereof taken in conjunction with the accompanying drawings.

BRIEF DESCRIPTION OF THE DRAWINGS

FIG. 21A is a plan view showing a further embodiment of the present invention;

FIG. 21B is a sectional view taken along line C—C' in FIG. 21A;

DETAILED DESCRIPTION OF PREFERRED EMBODIMENTS

Embodiment 1

Figure 1:
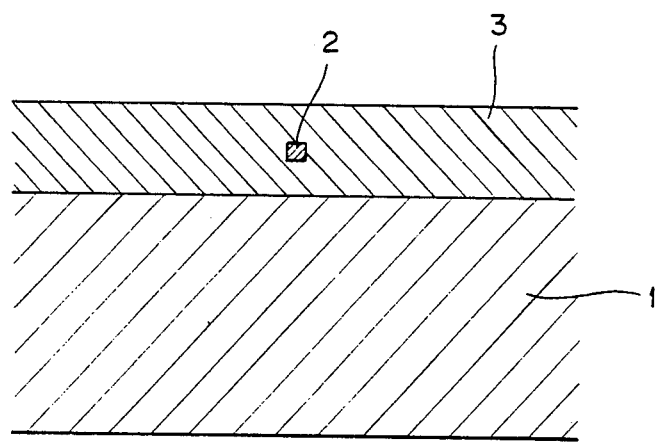
FIG. 1 is a sectional view showing one example of a prior art silica optical waveguide.
Figure 2:
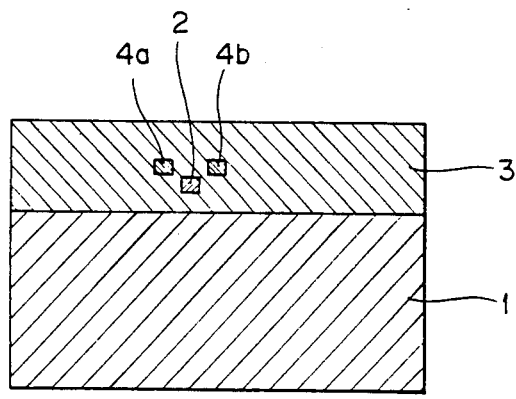
FIG. 2 is a sectional view showing one embodiment of a silica optical waveguide in accordance with the present invention.

FIG. 2 is a sectional view showing a first embodiment of a silica single mode optical waveguide with stress applying portions in accordance with the present invention. A structure in which a cladding layer 3 is disposed on a silica substrate 1 and a core portion 2 is embedded into the cladding layer 3 is substantially similar to that of the conventional optical waveguide shown in FIG. 1. However, in the present embodiment of the present invention, stress applying portions 4a and 4b composed, for example, of silicon, are disposed in the vicinity of the core portion 2.

Figure 3:
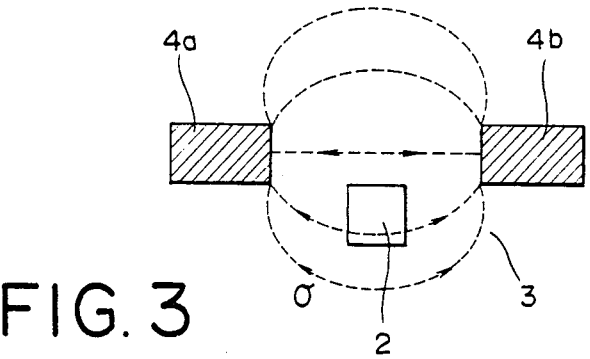
FIG. 3 is an explanatory diagram used to explain the distribution of stress in the embodiment shown in FIG. 2.

FIG. 3 is an explanatory diagram used to explain the stress distribution around the core portion 2 shown in FIG. 2. After the fabrication steps at high temperatures to be described in more detail below, tensile stresses act on the core portion 2 at room temperature due to differences in thermal expansion coefficient between the core portion 2 and the silicon stress applying portions 4a and 4b. In a the case of an optical waveguide in which the core portion 2 was 10 μm × 10 μm and the silicon stress applying portions 4a and 4b were 10 μm × 17 μm and the distance between the core portion 2 and the silicon stress applying portion 4a or 4b was 12 μm, the measured birefringence B was $1.5 \times 10^{-4}$. This value was about five times as high as the B value of the optical waveguide fabricated on the silica substrate 1 without providing a stress applying portion. Thus, it was confirmed that the silicon stress applying portions 4a and 4b affect the value of B.

FIGS. 4A–4E show an embodiment of steps for fabricating the silica single mode optical waveguide with the stress applying portions 4a and 4b of the type described above with reference to FIG. 2.

Figure 4A:
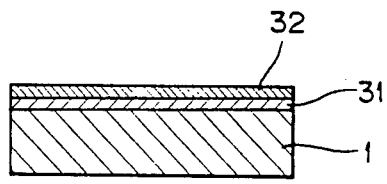
FIGS. 4A–4E are sectional views showing an embodiment of steps of fabrication of the embodiment of the optical waveguide shown in FIG. 2.
Figure 4B:
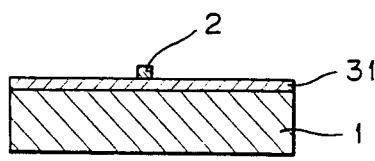

First, as shown in FIG. 4A, a silica optical waveguide film consisting of a lower cladding layer 31 and a core layer 32 is deposited on the surface of the silica glass substrate 1. Then, an undesired portion of the core layer 32 is removed by a reactive ion etching process to define the core portion 2 in the form of ridge, as shown in FIG. 4B.

Figure 4C:
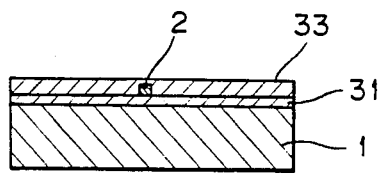
Figure 4D:
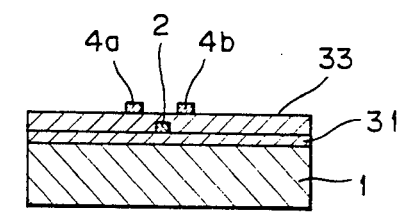

Thereafter, as shown in FIG. 4C, an intermediate cladding layer 33 is deposited in such a way that the core portion 2 is embedded in the intermediate cladding layer 33. Subsequently, an amorphous silicon (a-Si) layer is formed on the surface of the intermediate cladding layer 33 by a high speed sputtering process. Next, an undesired portion is removed by an etching process to form the stress applying portions 4a and 4b.

Figure 4E:
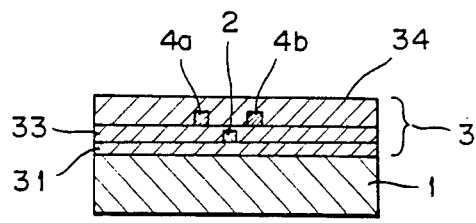

Finally, as shown in FIG. 4E, an upper cladding layer 34 is deposited in such a way that the stress applying portions 4a and 4b are embedded therein. Then, the thus laminated structure is subjected to a heat treatment process at a high temperature (between 1100°–1200° C.). As a result, a-Si is converted into polycrystalline silicon, and during the step for cooling the optical waveguide thus fabricated to room temperature, stress-induced birefringence is produced as shown in FIG. 3.

Embodiments 2–5

FIGS. 5–8 are sectional views showing a second embodiment, a third embodiment, a fourth embodiment and a fifth embodiment, respectively, in accordance with the present invention.

Figure 5:
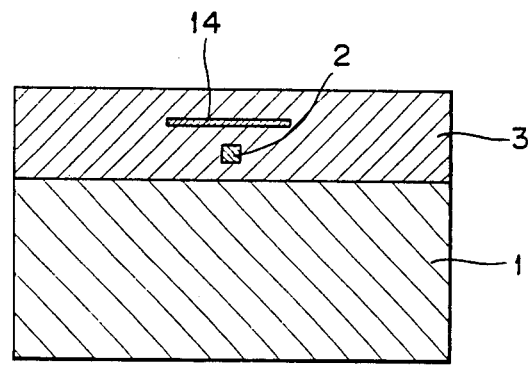
FIGS. 5–8 are sectional views showing other embodiments of the present invention, respectively.

In the second embodiment as shown in FIG. 5, a stress applying portion 14 is provided above the core portion 2 within the cladding layer 3, so that the compression stress is imparted to the lower core portion 2 from the stress applying portion 14 and consequently a high degree of birefringence having a sign opposite to that of the birefringence of the first embodiment is produced.

Figure 6:
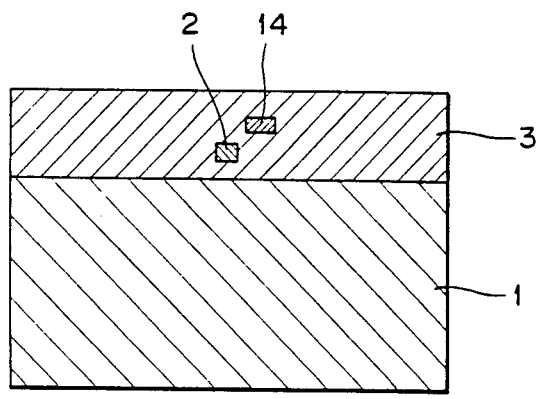

In the third embodiment as shown in FIG. 6, the stress applying portion 14 is provided at a position obliquely upwardly of the core portion 2. In this embodiment, stress-induced birefringence having the principal axis inclined at 45° with respect to the main surface of the substrate 1 can be obtained.

Figure 7:
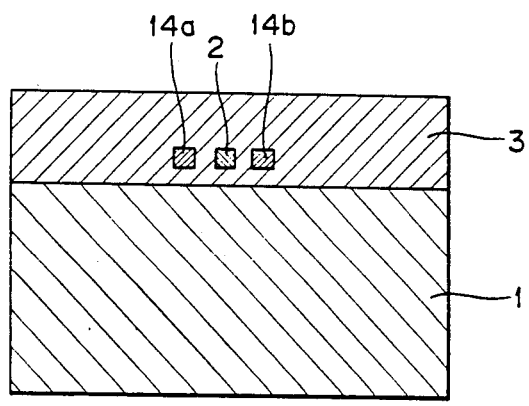

In the fourth embodiment as shown in FIG. 7, stress applying portions 14a and 14b are disposed on both sides of the core portion 2 by a combination of a deposition process and an etching process.

Figure 8:
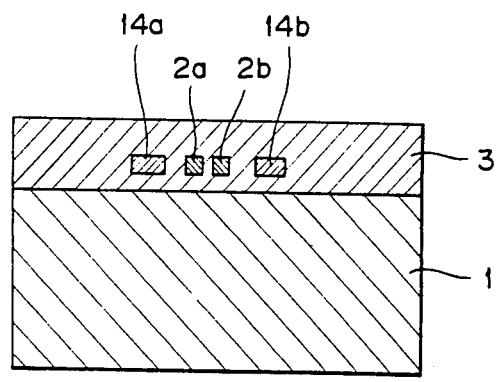

In the fifth embodiment as shown in FIG. 8, the stress applying portion 14a and 14b are defined on both sides of a directional coupler composed of two core portions 2a and 2b. In this embodiment, the coupling coefficient of the directional coupler is dependent on polarization.

In the above described embodiments, the stress applying portions 4a, 4b, 14, 14a and 14b are composed of silicon, but it is to be understood that any material can be used as far as it will not react with silica glass at a high temperature and which has a thermal expansion coefficient different from that of the surrounding silica glass. For instance, platinum, silicon nitride or the like may be used. Furthermore, glass which is considerably different in composition from the silica glass forming the core portion 2 or the cladding layer 3, for example, silica glass containing a large amount of $B_2O_3$ deposited by, for instance, a CVD process may be used. However, it is not preferable to form a stress applying portion by glass containing an alkali metal, because the surrounding silica glass is crystallized.

In the fabrication steps shown in FIGS. 4A–4E, an a-Si layer is often used as an anti-etching mask having resistance to etching when an optical waveguide film is formed by a reactive ion etching process, so that in some case, after the etching step, a part or whole of the anti-etching mask can be left unremoved and embedded into the upper cladding layer 34, so that the unremoved anti-etching mask defines the stress applying portions 4a and 4b.

So far, the substrate 1 has been described as consisting of silica glass, but it is of course apparent that the stress applying portion or portions are effective as means for controlling birefringence, even when a silicon substrate is used as the substrate 1. In the case of the silicon substrate, it must be taken into consideration that, unlike the silica glass substrate, the optical waveguide receives as a bias force a high degree of compression stress (corresponding to a birefringence value of the order of $10^{-4}$) as a whole.

It is of course possible to position the stress applying portion or portions at a desired position or positions in the longitudinal direction of the optical waveguide.

As described above, in the first to fifth embodiments, the stress applying portions 4a, 4b, 14, 14a and 14b are disposed in the vicinity of the core portions 2, 2a and 2b within the cladding layer 3, and the degree of birefringence in the optical waveguide can be precisely controlled by varying the position and shape of the stress applying portion. Therefore, the present invention is remarkably useful in a case of fabricating an optical waveguide type optical component part to be used in a optical sensor or a coherent optical communication system in which the polarization characteristics of the component play a very important role.

Embodiment 6

Figure 9A:
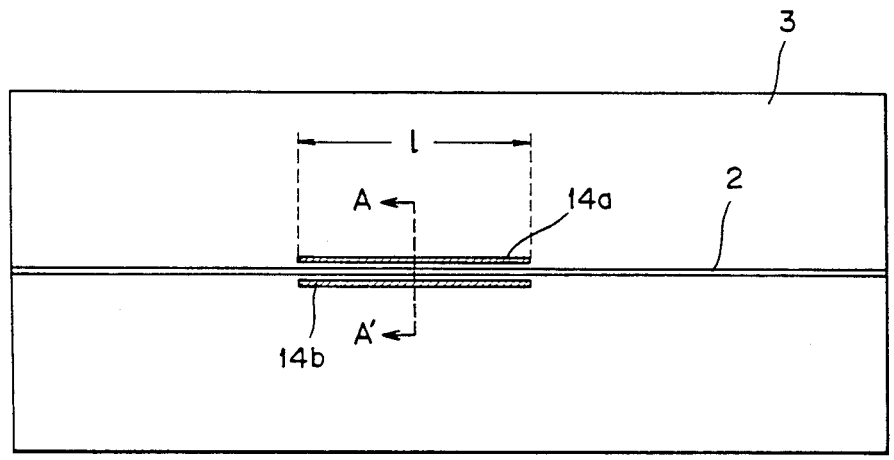
FIGS. 9A and 9B are a plan view and an enlarged sectional view, respectively, showing one embodiment of a waveguide type optical phase plate constructed by an optical waveguide in accordance with the present invention.
Figure 9B:
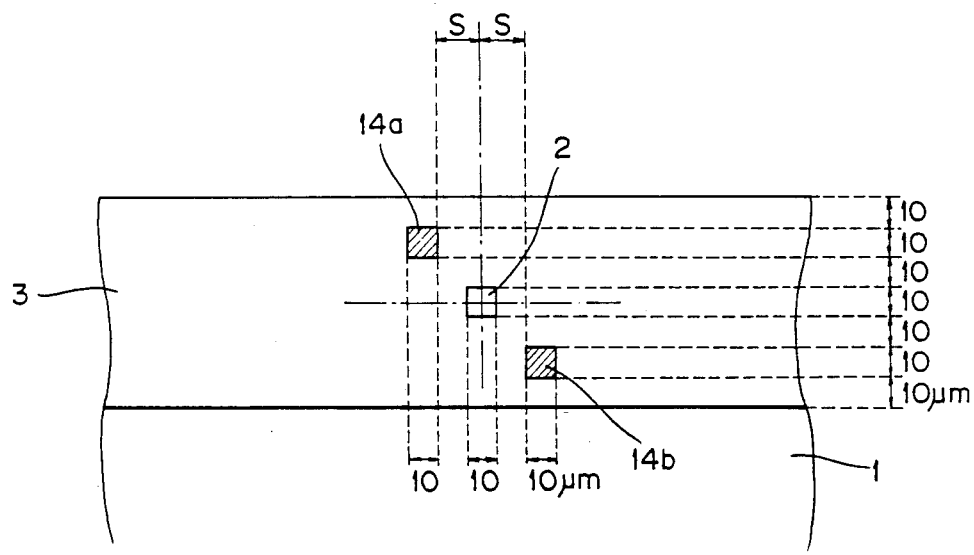

FIGS. 9A and 9B show an embodiment of a waveguide type optical phase plate constructed by an optical waveguide in accordance with the present invention.

FIG. 9A is a plan view thereof, while FIG. 9B is a sectional view, on an enlarged scale, taken along line A—A' in FIG. 9A. The silica core portion 2 (10 $\mu m \times 10$ $\mu m$) and the polysilicon stress applying portions 14a and 14b (10 $\mu m \times 10$ $\mu m$) are embedded into the silica cladding 1 (approximately 70 $\mu m$ in thickness) formed on the surface of the silica glass substrate 1. The stress applying portions 14a and 14b are disposed on both sides of the core portion 2 and are spaced apart from the center of the core portion 2 by a distance S in a diagonal direction, and the portions 14a and 14b are extended along the core portion 2 by a distance l.

Such a structure can be fabricated by a combination of a deposition process and an etching process. Due to the stress applying portions 14a and 14b, a tensile stress acts on the core portion 2 in a diagonal direction thereof. Here, the direction of the principal axis of stress-induced birefringence can be varied by selecting the distance S. In this embodiment, the distance S is 19 $\mu m$, so that the direction of the principal axis of stress-induced birefringence is inclined by 45° with respect to the major surface of the substrate 1. In this case, the magnitude B of stress-induced birefringence is of the order of $0.8 \times 10^{-4}$ and the distance l is selected to satisfy the following relation:

$$B \cdot l = \lambda/2,$$

where $\lambda$ is the wavelength of light used. For instance, the length l of each of the stress applying portions 14a and 14b becomes 5 mm when $\lambda$ is 1.3 $\mu m$. As a result, the optical waveguide with the stress applying portions as shown in FIGS. 9A and 9B functions as a half wave plate having the optical axis inclined by 45° with respect to the major surface of the substrate 1. When a linearly polarized TE wave (having an electric field direction in parallel with the major surface of the substrate 1) is incident on the core portion 2 from the left end of the optical waveguide shown in FIG. 9A, the light beam passes through the stress applying region formed by the stress applying portions 14a and 14b, so that the direction of polarization of the light beam is rotated by 45°×2=90°, and then the light beam is emitted from the right end of the core portion 2 as a TM wave (having an electric field perpendicular to the major surface of the substrate 1). Thus, the optical waveguide shown in FIGS. 9A and 9B functions as a TE/TM mode converter. In addition, in accordance with the manners of setting values of S and, various waveguide type optical phase plates such as a half wave plate, a quarter wave plate or the like having optical axes extended in various directions can be realized.

Embodiment 7

Next, the present invention will be explained with reference to an embodiment thereof in which a stress relief groove or grooves are formed in the cladding layer 3 adjacent to the core portion 2 in order to control the birefringence of the optical waveguide. The stress relief grooves may be arranged on both sides of the core portion in symmetric relationship with the core portion 2 or only one stress relief groove may be arranged only on one side of the core portion 2. Birefringence of the optical waveguide can be controlled by suitably selecting the position, the depth and the width of the stress relief groove.

Figure 10:
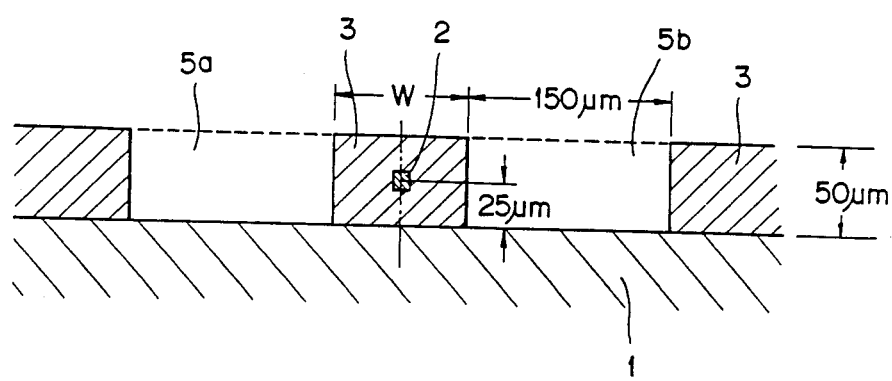
FIG. 10 is a sectional view showing a further embodiment of a silica optical waveguide in accordance with the present invention.

FIG. 10 illustrates a seventh embodiment of the present invention in which, unlike the prior art optical waveguide shown in FIG. 1, open grooves 5a and 5b are formed along the core portion 2 on both sides thereof and in symmetric relationship with respect to the core portion 2 within the cladding layer 3. The cladding layer 3 is 50 μm in thickness and consists of $SiO_2$ glass. The core portion 2 consists of $SiO_2$-$TiO_2$ glass and has a cross section of 8 μm×8 μm. The height of its center axis is 25 μm from the major surface of the Si substrate 1. The grooves 5a and 5b are 150 μm in width and are formed on both sides of the core portion 2, while leaving the cladding portion 3a with a width W around the core portion 2

Figure 11:
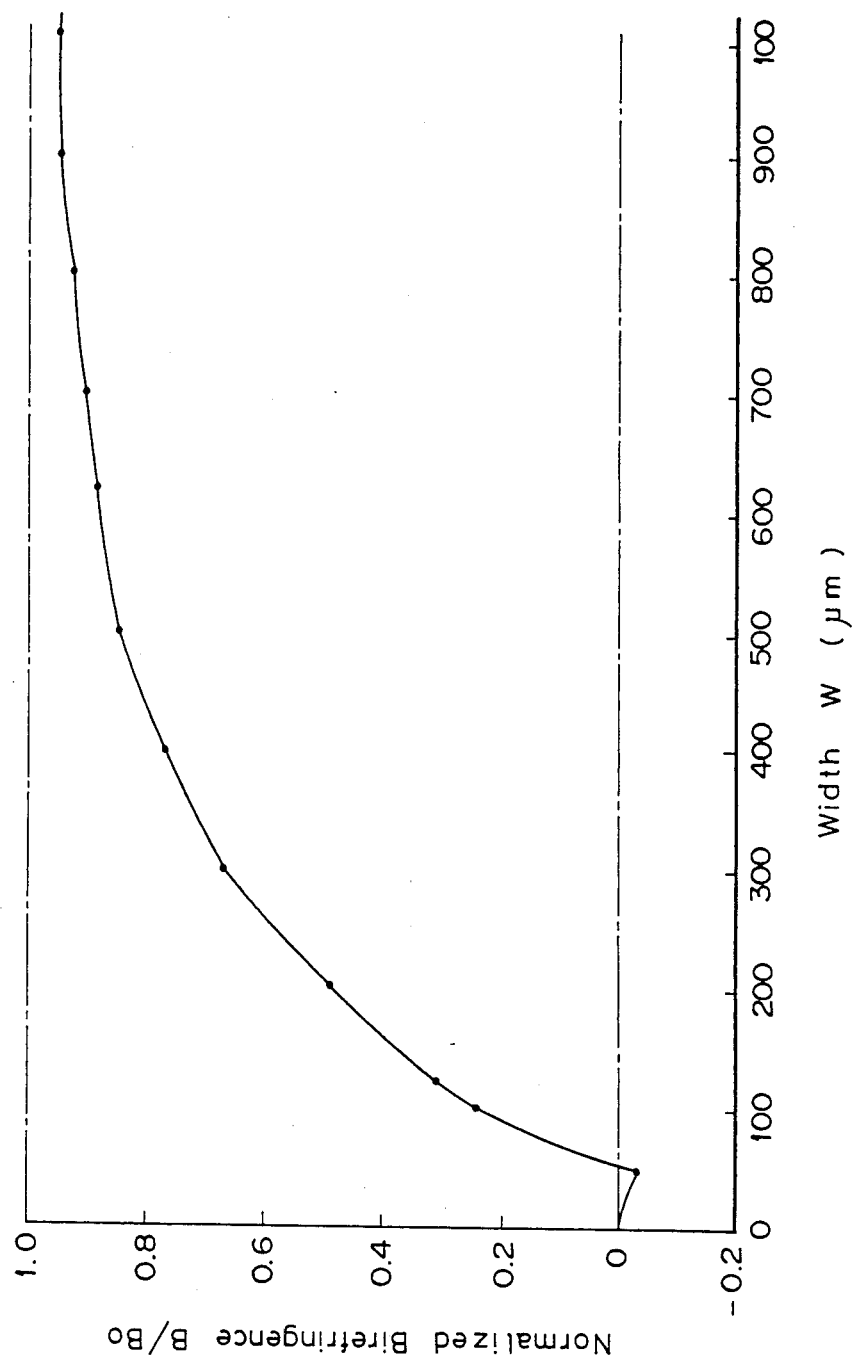
FIG. 11 illustrates a predicted characteristic curve of birefringence values obtained by a definite element method.

FIG. 11 illustrates the dependence of the normalized birefringence B/Bo (where Bo represents the value of birefringence when both the grooves 5a and 5b are not formed) on the width W of the optical waveguide shown in FIG. 10, obtained by an analysis of the stress distribution of the optical waveguide.

As the width W becomes wider, the value B of the birefringence of the optical waveguide approaches a predetermined value Bo, which is dependent mainly upon the difference in the thermal expansion coefficient between silica glass and the Si substrate. On the other hand, when the width W becomes narrow, the value of B is decreased. For instance, when W=100 μm, B/Bo is decreased to be almost equal to 0.25. Therefore, FIG. 11 shows that the birefringence value B of the optical waveguide can be determined to be a desired value by varying the positions of the grooves 5a and 5b which are represented by the parameter W. It should be noted that if necessary, the birefringence value can be made almost equal to zero.

FIGS. 12A-12D show an embodiment of sequential steps for fabricating the silica single mode optical waveguide with stress relief grooves as shown in FIG. 10.

Figure 12A:
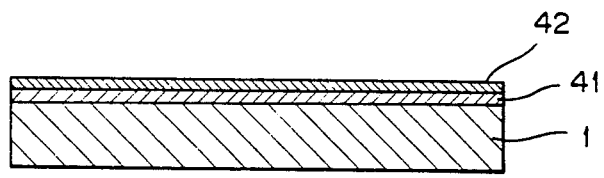
FIGS. 12A–12D are sectional views showing one embodiment of steps for fabricating the optical waveguide shown in FIG. 10.
Figure 12B:
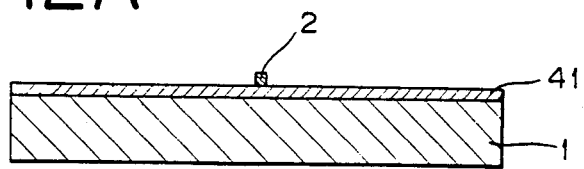

First, as shown in FIG. 12A, a silica optical waveguide consisting of a lower cladding layer 41 and a core layer 42 is deposited on one major surface of an Si substrate 1. Next, as shown in FIG. 12B, an undesired portion of the core layer 42 is removed by a reactive ion etching process to form a ridge-shaped core portion 2.

Figure 12C:
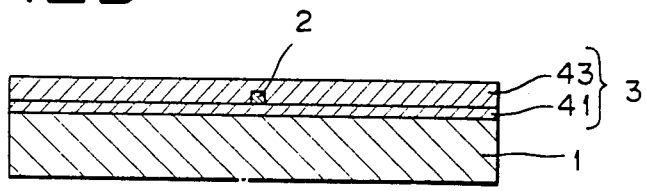

In the step shown in FIG. 12C, an upper cladding layer 43 is deposited to embed the core portion 2 therein, so that the cladding layer 3 is formed together with the lower cladding layer 41.

Figure 12D:
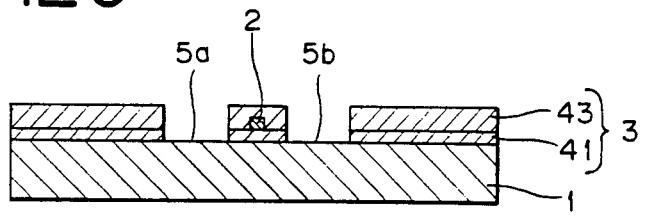

Finally, as shown in FIG. 12D, grooves 5a and 5b for relieving residual stress are recessed along the core portion 2 in the cladding layer 3 by a reactive ion etching process. As a result, the optical waveguide as shown in FIG. 10 is obtained.

A measured value B of birefringence was $1.1 \times 10^{-4}$ in the case that the optical waveguide (W=100 μm) having the structural parameters as shown in FIG. 10 was fabricated. In the case of the optical waveguide in which no groove was formed, the birefringence value Bo was $4.0 \times 10^{-4}$. Therefore, these values obtained by the practical measurements closely coincide with the results of the theoretical analysis by the definite element method shown in FIG. 11.

In the above-described embodiment, while the width of the grooves 5a and 5b is determined to be 150 μm, it should be noted that when the groove width is greater than 100 μm, the dependence of the value B on the groove width is negligibly small. In some case, the groove width may be infinite. That is, one side of one groove 5a or 5b which is remote from the core portion may be open-ended.

Embodiment 8

Figure 13:
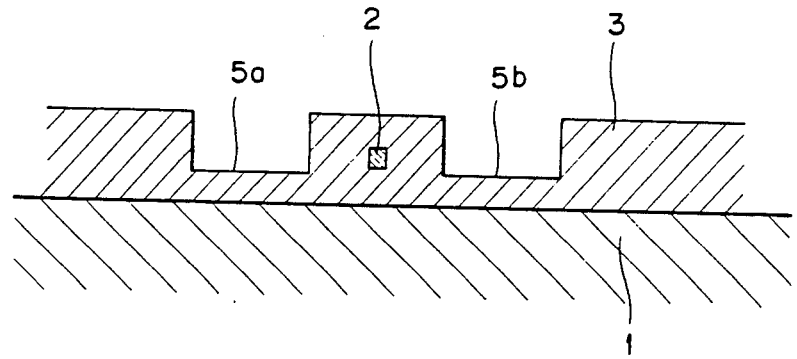
FIGS. 13, 14 and 15A–15E are sectional views showing further embodiments of an optical waveguide in accordance with the present invention.

While in the embodiment shown in FIG. 10, the grooves 5a and 5b reach the surface of the substrate 1, the depth of the grooves 5a and 5b can be adjusted, as shown in FIG. 13, to control the birefringence value B of the optical waveguide. A method in which the value B is measured while the grooves 5a and 5b are being formed by a reactive ion etching and the etching process is interrupted when a desired birefringence value B is obtained is effective to precisely obtain a desired birefringence.

Embodiment 9

Figure 14:
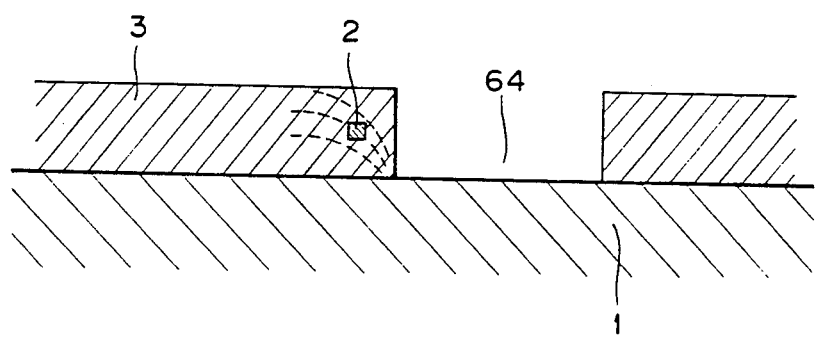

FIG. 14 shows a further embodiment of the present invention in which a stress relief groove 64 is formed only on one side of the core portion 2. A compression stress can be produced adjacent to the core portion 2 in a diagonal direction, as indicated by the broken lines in FIG. 14. This embodiment is effective when it is desired that the direction of the principal axis of birefringence of the optical waveguide be displaced from a direction perpendicular to or in parallel with the major surface of the substrate 1.

Embodiments 10-14

The cross sectional configuration of the stress relief groove is not limited to a rectangle as described above and can be varied as shown in FIGS. 15A-15E.

Figure 15A:
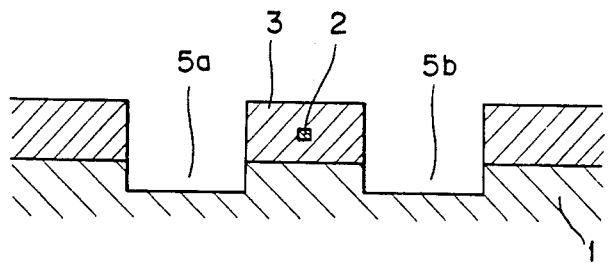

In FIG. 15A, after the grooves which reach the major surface of the substrate 1 are formed on both sides of the core portion 2 in the cladding layer 3, the bottoms of the grooves 5a and 5b are further recessed into the region of the substrate 1 to form the grooves 5a and 5b, each having a depth deeper than the thickness of the cladding layer 3.

Figure 15B:
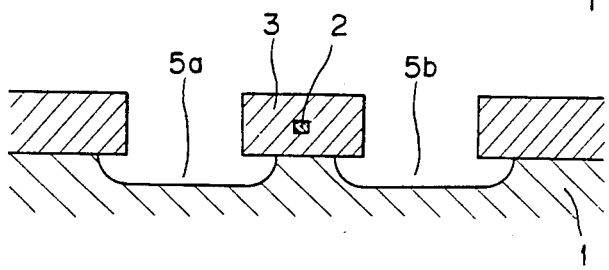

In FIG. 15B, after the grooves which reach the major surface of the substrate 1 are formed, the optical waveguide is immersed in a wet etching liquid (for instance, a mixture of hydrofluoric acid, nitric acid and acetic acid), so that the desired regions of the Si substrate 1 including the regions immediately below the cladding layer 3 are etched out to form the stress relief grooves 5a and 5b. Both of the embodiments shown in FIGS. 15A and 15B have a high degree of stress relieving effect, as compared with the optical waveguide in which the Si substrate 1 is not etched at all.

Figure 15C:
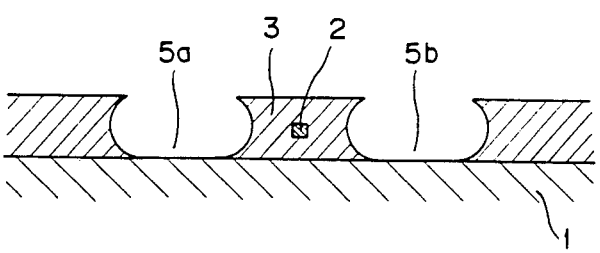

FIG. 15C shows an optical waveguide in which the stress relief grooves 5a and 5b are formed by a wet etching process using hydrofluoric acid instead of a reactive ion etching process. In the case of etching, the surfaces of the cladding layer 3 except the portions in which the stress relief grooves 5a and 5b are formed are protected by a silicon nitride film as a mask which has resistance to etching with hydrofluoric acid. This etching process is simpler than reactive ion etching process, but has a problem in that the etching control is rather difficult.

Figure 15D:
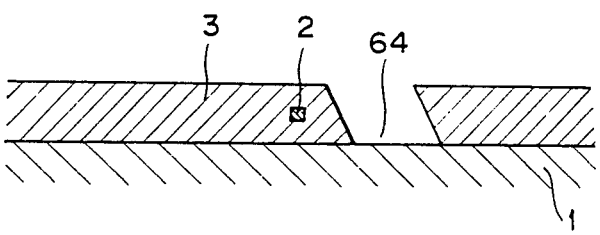
Figure 15E:
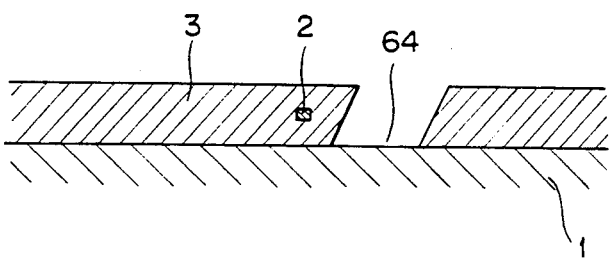

In the embodiments shown in FIG. 15D and FIG. 15E, a reactive ion beam etching process which is a kind of reactive ion etching process is used. The major surface of the substrate 1 is inclined with respect to the direction of the ion beam so as to perform etching, so that a stress relief groove 64 which is inclined at an angle with respect to the major surface of the substrate 1 is formed in the cladding layer 3. These embodiments are effective when it is desired that the direction of the principal axis of birefringence in the optical waveguides is determined to be off a direction perpendicular to or in parallel with the major surface of the substrate 1.

Embodiment 15

Figure 16:
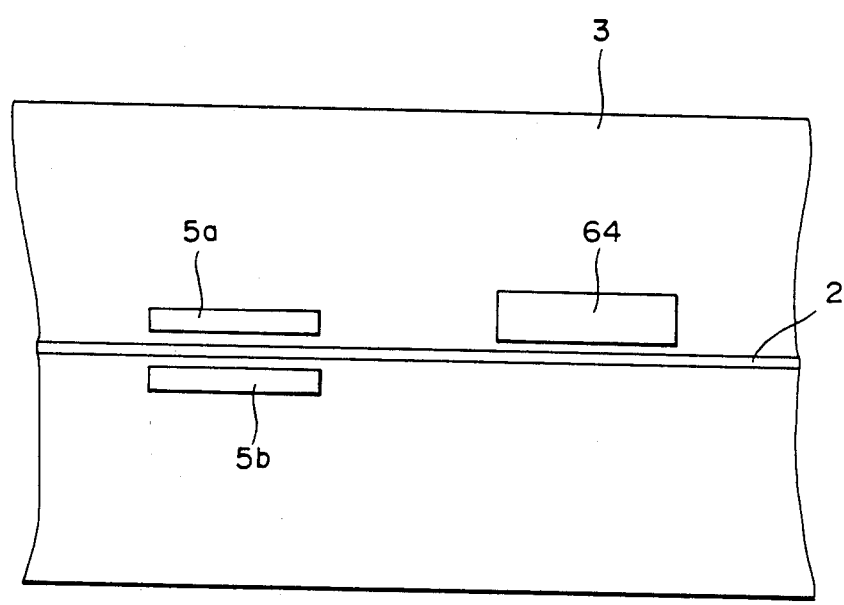
FIG. 16 is a plan view showing a further embodiment of an optical waveguide in accordance with the present invention.

In the embodiments 7-14 described above, it is not needed that the stress relief grooves 5a, 5b and 64 are defined uniformly along the core portion 2 of the optical waveguides. It is of course possible to distribute the groove at a desired position along the core portion 2 as shown in FIG. 16. The arrangement as shown in FIG. 16 is effective especially when it is desired to locally vary the birefringence characteristics in the optical waveguide.

Embodiment 16

Figure 17A:
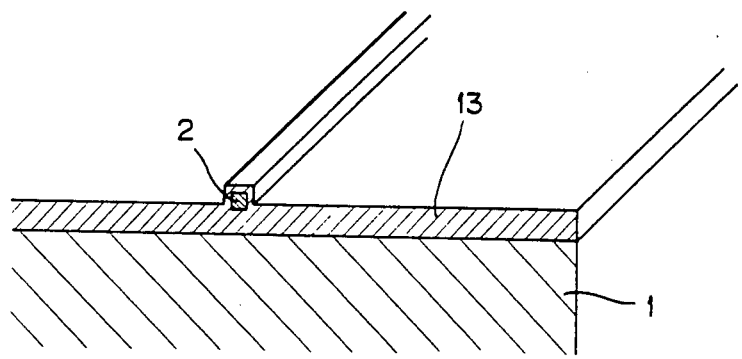
FIGS. 17A and 17B are perspective views showing further embodiments of an optical waveguides in accordance with the present invention.
Figure 17B:
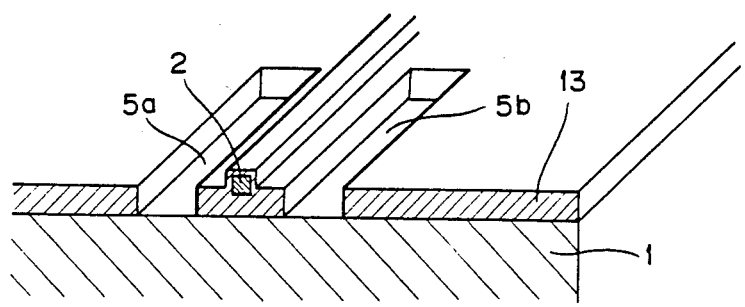

In the embodiments described above, the structure of a single mode optical waveguide prior to the formation of a stress relief groove is such that the core portion 2 is completely embedded or buried in the cladding layer 3 and the upper surface of the cladding layer 3 is substantially flat. It is, however, to be understood that the present invention is not limited to such a structure. FIG. 17B shows an embodiment in which the stress relief grooves 5a and 5b are formed in a single mode optical waveguide in which the core portion 2 is covered with a relatively thin cladding layer 13, so that the surface of the cladding layer 13 is not flat FIG. 17A is a perspective view of this embodiment prior to the formation of the stress relief grooves, while FIG. 17B is a perspective view thereof after the stress relief grooves 5a and 5b have been formed The structure as shown in FIG. 17B can be fabricated by a conventional process in which the core portion 2 is coated with a relatively thin glass layer (a few μm in thickness) by a CVD or sputtering process in a step succeeding the step shown in FIG. 4B in the fabrication of the optical waveguide in accordance with the sequential steps as shown in FIGS. 4A-4E. Here, reference is made to A. Himeno et al, Electron Lett., Vol. 21, No. 20, pp. 1020-1021, (1985). FIG. 17B shows the stress relief grooves 5a and 5b which are formed on both sides of the core portion 2 of the optical waveguide as described above in such a way that the bottoms of the stress relief grooves 5a and 5b reach the major surface of the Si substrate. The stress-induced birefringence characteristics of the core portion 2 can be controlled by suitably adjusting or selecting a position, a width, a length or the like of the stress relief grooves 5a and 5b, as in the cases of the above-described embodiments It is of course possible to provide the stress relief groove only on one side of the core portion 2 so that the direction of the principal axis of birefringence is varied.

In the embodiments 7-16, it has been described that the silica single mode optical waveguide is fabricated on the silicon substrate, but it is of course possible that the present invention may be equally applied to other single mode optical waveguide composed of other material, for example, an optical waveguide fabricated on a multicomposition series glass substrate by an ion diffusion process as long as the optical waveguide receives a stress from the substrate.

As described above, according to the present invention, the stress relief groove is formed along the core portion of the optical waveguide in predetermined portions of the cladding layer thereof, so that the birefringence value of the optical waveguide can be easily controlled.

That is, according to the present invention, birefringence can be controlled only by the formation of grooves without changing a composition of the glass and the kind of substrate. In addition, birefringence can be controlled selectively only at a predetermined position along the optical waveguide on the substrate and, if required, the principal axis of stress can be selected in a direction other than a direction in parallel with or perpendicular to the major surface of the substrate.

Therefore, according to the present invention, a waveguide type component such as a quarter-wave plate, a half-wave plate, a polarizer, a directional coupler, an interferometer, a ring resonator or the like which is used in a coherent optical communication system or optical sensor in which polarization characteristics play an important role, can be fabricated with a high degree of accuracy.

Embodiment 17

When a silicon substrate is used as the substrate, it is possible to remove a portion of the silicon substrate by, for instance, an etching process in such a way that a portion of an optical waveguide having a silica cladding layer formed on the silicon substrate and a core portion embedded or buried into the cladding layer is separated from the silicon substrate.

Figure 18A:
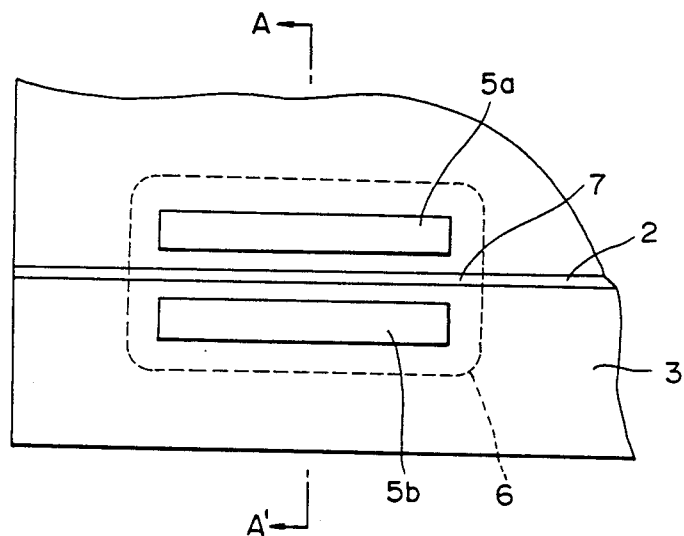
FIG. 18A is a plan view showing a further embodiment of an optical waveguide in accordance with the present invention.
Figure 18B:
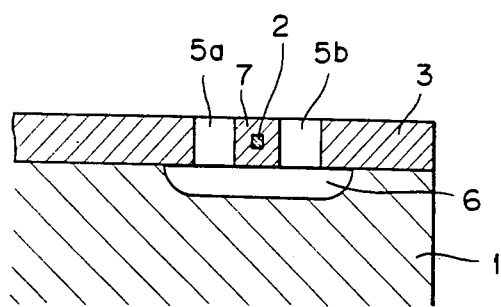
FIG. 18B is a sectional view taken along line A—A' in FIG. 18A.

A 17th embodiment having the above-described structure is shown in FIG. 18A and FIG. 18B. FIG. 18A is a plan view, while FIG. 18B is a cross sectional view taken along line A—A' in FIG. 18A.

As is apparent from FIGS. 18A and 18B, the cladding layer 3 is deposited on the silicon substrate 1 and the core portion 2 as the main body of the optical waveguide is embedded in the cladding layer 3. The grooves 5a and 5b are formed on both sides of and along the core portion 2 in such a way that the bottoms of the grooves 5a and 5b reach the major surface of the silicon substrate 1. A portion of the silicon substrate 1 is removed by a chemical etching process through the grooves 5a and 5b. Therefore, there is provided a separated optical waveguide 7 in which the optical waveguide containing the core portion 2 is separated from the silicon substrate 1 in a region 6 where the silicon substrate 1 is removed. Therefore, adverse effects upon the optical waveguide portion 7 from the silicon substrate 1 can be minimized.

In the embodiment of the type shown in FIGS. 18A and 18B, the cladding layer 3 was 50 $\mu$m in thickness and composed of $SiO_2$ glass. The core portion 2 consisted of $SiO_2$-$TiO_2$ glass having a square cross section of 8 $\mu$m×8 $\mu$m and the height of the center position of the core portion 2 from the major surface of the silicon substrate 1 was 25 $\mu$m. Both the grooves 5a and 5b are 50 $\mu$m in width and the separate optical waveguide portion 7 interposed between the grooves 5a and 5b was 50 $\mu$m in width.

The grooves 5a and 5b were formed by removing predetermined portions of the cladding layer 3 by a reactive ion etching process and thereafter the silicon substrate 1 was immersed in an isotropic etchant for silicon for about ten minutes so that the predetermined portion 6 of the silicon substrate 1 was removed by a selective etching process. The etchant used in this embodiment was a mixture of 9 ml hydrofluoric acid, 75 ml of nitric acid and 30 ml of acetic acid.

Birefringence of the optical waveguide of the type described above with reference to FIGS. 18A and 18B was evaluated by a polarization measurement. As a result, the birefringence B of the separated optical waveguide portion 7 corresponding to the region 6 where the silicon substrate 1 was removed was as low as $10^{-5}$, which is considerably lower than a birefringence value B of $4\times10^{-4}$ in the portion of the silicon substrate 1, which was not removed by etching. Thus, it was confirmed that the stress is relieved by separating the optical waveguide portion 7 from the silicon substrate 1.

Embodiment 18

Figure 19A:
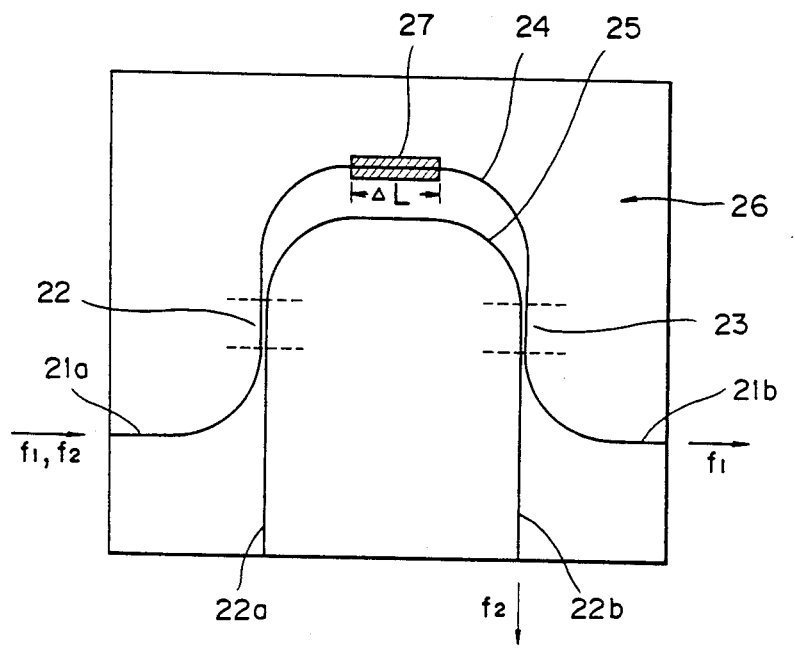
FIGS. 19A and 19B are a plan view and a partially enlarged plan view showing an optical frequency multiplex circuit in accordance with the present invention.
Figure 19B:
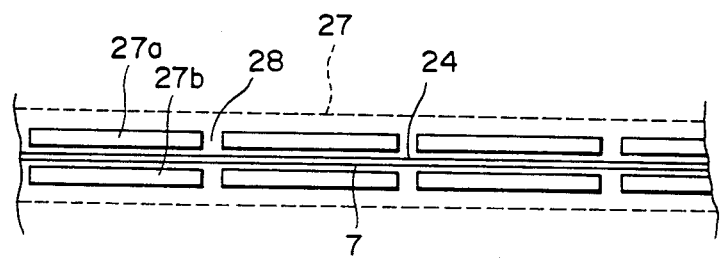

FIGS. 19A and 19B show a specific embodiment of an optical frequency multiplexing circuit which embodies the present invention and which is polarization-insensitive.

FIG. 19A is a plan view of the optical frequency multiplexing circuit which comprises an $SiO_2$ cladding layer 26 formed on a silicon substrate and two single mode core portions 24 and 25 embedded in the cladding layer 26. The two core portions 24 and 25 are partially very closely spaced apart from each other and in parallel with each other to form directional couplers 22 and 23. The directional couplers 22 and 23, have structural parameters which are so selected that the coupling efficiency is about 50%. The two core portions 24 and 25 which couple the directional couplers 22 and 23 to each other are different in length by $\Delta L$. The silicon substrate is partially removed to form a recess region 27 which is extended along a part of the longer core portion 24 by a distance equal to $\Delta L$ in the silicon substrate. The value of birefringence of the separated optical waveguide portion 7 corresponding to this recess region 27 is substantially equal to zero.

The length $\Delta L$; that is, the length of the recess region 27 in the silicon substrate (corresponding to the length of the separated optical waveguide portion 7) is as long as a few mm or more. Therefore, it is necessary to prevent damage to the optical waveguide portion 7. Thus, as shown at enlarged scale in FIG. 19B showing the recess region 27 defined in the silicon substrate, the recess region 27 is divided into a plurality of sections of grooves 27a and 27b for removing predetermined portions of the silicon substrate which are disposed along the optical waveguide portion 7 in the longitudinal direction thereof. Therefore, the separated optical waveguide portion 7 is supported by a plurality of bridge structures 28.

In this embodiment, the cross sections of the core portions are equal in size to that of the first embodiment. Each of the divided sections of the grooves 27a and 27b is 450 $\mu$m in length and the bridge structure 28 is 50 $\mu$m in width. The bridge structure 28 is repeatedly disposed at an interval of 500 $\mu$m, so that the optical waveguide portion 7 (the recess region 27 formed by removing the silicon substrate) having a desired length is formed.

Two light signals $f_1$ and $f_2$ which are different from each other in frequency by $\Delta f$ in the 1.5 $\mu$m wavelength band are incident to an input port 21a at one end of the core portion 24 and then divided equally by the directional coupler 22 to be transmitted through the core portions 24 and 25, respectively. These divided light signals are recombined by the directional coupler 23. When the length $\Delta L$ of the region 27 is so selected that $\Delta L = C/(2n\cdot\Delta f)$, the optical signals $f_1$ and $f_2$ are separately derived from output ports 21b and 22b, respectively, at the other ends of the two core portions 24 and 25, respectively.

In like manner, when two light signals $f_1$ and $f_2$ enters an input port 22a at one end of the core portion 25, they are separately derived from the output ports 21b and 22, respectively. In the above-described equation, C represents the velocity of light in vacuum and n indicates the refractive index. In this embodiment, $\Delta f = 20$ GHz so that $\Delta L = 5.1$ mm is obtained from the above-described relation.

When no recess region 27 is formed in the silicon substrate, the difference $\Delta L$ in the optical path is varied by $\Delta L \cdot B$ in accordance with the direction of polarization of the light signal which is incident on the input port 21a. In this case, the Mach-Zehnder interferometer system as shown in FIG. 19A exhibits a strong dependence on polarization, so that there exists a defect that input polarization must be a linear polarization, either a TM or a TE wave. On the other hand, according to this embodiment in which the recess region 27 is formed in the substrate, the value B of the optical path corresponding to $\Delta L$ is substantially zero; that is, $\Delta L \cdot B \approx 0$, so that the Mach-Zehnder interferometer in the form of an optical frequency multiplexing circuit does not exhibit the dependence on polarization and consequently stable operation can be ensured regardless of the direction of polarization of an input signal light. That is, it is clear that optical frequency multiplex transmission can be realized without using a complicated polarization plane controller.

Embodiment 19

Figure 20A:
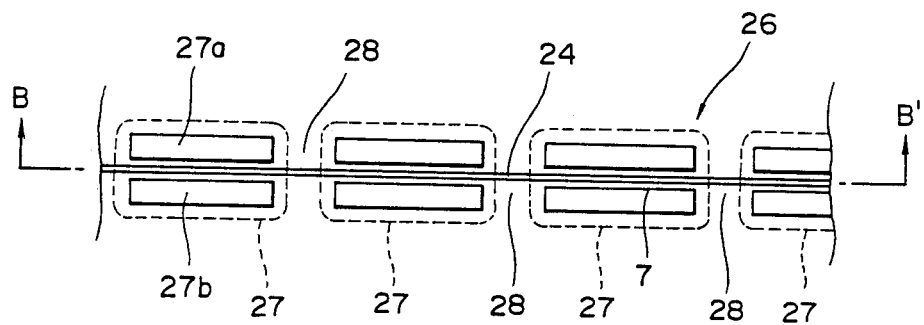
FIG. 20A is a plan view showing a modification thereof.
Figure 20B:
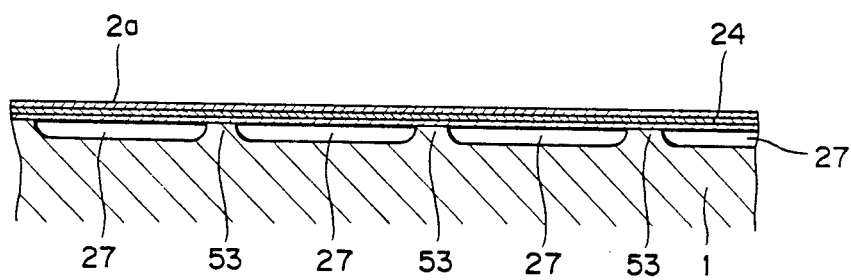
FIG. 20B is a sectional view taken along line B—B' in FIG. 20A.

While FIG. 19B shows an embodiment in which the grooves 27a and 27b which form the recess region 27 in the silicon substrate are composed of a plurality of divided sections and the mechanical strength of the optical waveguide portion 7 separated from the silicon substrate is maintained by the bridge structure 28, according to the present invention, a further structure as shown in FIGS. 20A and 20B can be used instead of the structure shown in FIG. 19B.

That is, FIGS. 20A and 20B show a further embodiment of the present invention in which an optical waveguide portion is separated from a silicon substrate and is supported by the silicon substrate. FIG. 20A is a plan view thereof, while FIG. 20B is a cross sectional view taken along line B—B' in FIG. 20A. This embodiment is different from the embodiment shown in FIG. 19B in that the width of the bridge structure 28 is greater in FIG. 20A than in FIG. 19B, so that even after the chemical etching process of the silicon substrate 1, silicon partially remains under the bridge structure 28 to form a residual silicon portion 53 and that consequently a plurality of recess regions 27 are arranged in cascade through the bridge structure 28. Because of the existence of the residual silicon portions 53, the optical waveguide portion 7 is securely supported by the silicon substrate 1, so that a separated structure is realized which maintains mechanical strength. Birefringence remains in the optical waveguide portion above the residual silicon portions 53, but desired operations of the optical frequency multiplexing circuit can be accomplished by making the whole effective length of a plurality of recess regions 27 defined in the silicon substrate 1 coincide with ΔL.

Embodiment 20

FIG. 21A is a plan view of a further embodiment of the present invention and FIG. 21B is a cross sectional view taken along line C—C' in FIG. 21A. Grooves 36a and 36b are formed along both sides of an SiO$_2$-TiO$_2$ core portion 2 embedded in an SiO$_2$ cladding layer 3 which is formed on a silicon substrate 1. The same sides (the right sides in FIG. 21A) of the grooves 36a and 36b are communicated through an elongated groove 36c. A predetermined portion of the silicon substrate 1 is subjected to a chemical etching process through these grooves 36a, 36b and 36c to form a recess region 37 in which the substrate 1 is etched out. A separated optical waveguide portion 38 consisting of the core portion 2 and the cladding layer 3 is partially cut off by the elongated groove 36c, so that the separated optical waveguide portion 38 extending over the recess region 37 in the silicon substrate 1 has a cantilever structure. As a result, the separated optical waveguide portion 38 in the form of a cantilever can be displaced slightly vertically by the elasticity of the optical waveguide. A mechanical pressure or an electrostatic force can be utilized as a force for causing the separated optical waveguide portion 38 to be displaced slightly. Thus, this embodiment is effectively adapted to construct an on-off type optical switch.

In embodiments 17-20, a predetermined portion of the silicon substrate is removed by a chemical etching process through the grooves formed in the cladding layer, but a desired portion of the silicon substrate can be etched out from the rear surface side thereof, thereby providing the optical waveguide construction of these embodiments. The etchant is not limited to an isotropic etchant, and an anisotropic etching process which utilizes the orientation of the silicon substrate may be used. In the latter case, a mixture of ethylene diamine and pyrocatechol or aqueous solution of potassium hydroxide may be used as the anisotropic etchant.

In either of the isotropic and anisotropic etching processes, the silica optical waveguide is slightly etched, when the silicon substrate is selectively etched. Here, the selection ratio of the order of 10:1-100:1 can be obtained, so that there is no fear that the optical waveguide structure is damaged.

In place of the so-called wet etching process described above, a dry etching process using CBrF$_3$, SF$_6$ or the like as an etching gas is employed that is, a plasma etching process can be also used to realize the optical waveguide structure in accordance with the present invention. In this case, in order to separate the optical waveguide portion from the silicon substrate, it is preferable to select conditions of the plasma etching process which tend to cause undercutting.

As described above, the process for forming the separated optical waveguide portion described above in accordance with the present invention is not fundamentally limited to the above processes and it is apparent that any process can be employed as long as the separated optical waveguide portions separated from the silicon substrate can be fabricated as described above According to the present invention, in order to define a separated optical waveguide portion which is formed by separating a predetermined portion of a silica optical waveguide from a silicon substrate, a predetermined portion of the silicon substrate is removed by a selective etching process As a result, the present invention is different from the prior art silica optical waveguide of the type in which the entire silica optical waveguide is made into intimate contact with and securely supported by the silicon substrate in that stress-induced birefringence can be locally eliminated and the optical waveguide is not restricted by the substrate but is locally movable As described above, according to the present invention, a predetermined portion of a silica optical waveguide formed on a silicon substrate can be separated from the silicon substrate, so that stress-induced birefringence can be eliminated and a portion of the optical waveguide can be made movable. Therefore, the present invention is remarkably effective and useful in the fabrication of an optical transmission component such as an optical frequency multiplexing circuit, an optical switch, or a high-performance waveguide type optical component such as optical sensor.

Embodiment 21

Next, an embodiment of a Mach-Zehnder interferometer embodying an optical waveguide in accordance with the present invention will be described An interferometer in which two optical couplers or, for instance, two directional couplers are interconnected to each other through two optical waveguides is called a Mach-Zehnder interferometer, which recently has been widely used in an optical switch, an optical sensor or a wave combining and splitting device for frequency multiplex optical communication. Such a Mach-Zehnder interferometer can be classified into (1) bulk type, (2) fiber type and (3) waveguide type, in accordance with their constructions. From viewpoints of reliability, productivity, compact size, light weight and so on, the waveguide type Mach-Zehnder interferometer is considered to be most useful.

Furthermore, the Mach-Zehnder interferometer can be classified into (a) symmetric type and (b) asymmetric type in accordance with the arrangement of the optical path. In the case of the symmetric type Mach-Zehnder interferometer, two optical waveguides interconnecting two optical couplers have the same length, while in the case of the asymmetric Mach-Zehnder interferometer, the two optical waveguides are intentionally made different in length.

Figure 22A:
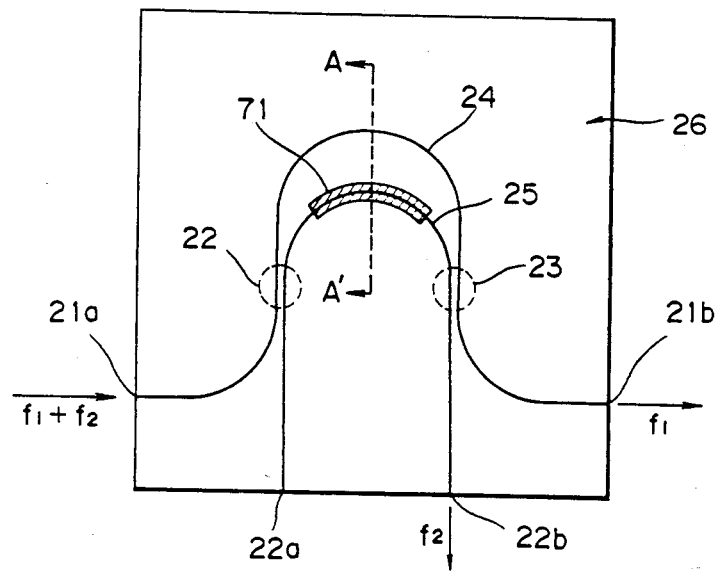
FIG. 22A is a plan view showing a conventional waveguide type Mach-Zehnder interferometer.
Figure 22B:
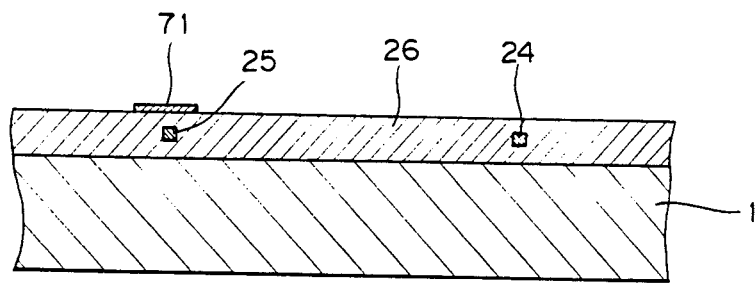
FIG. 22B is a sectional view taken along line A—A' in FIG. 22A.

FIG. 22A is a plan view of a conventional asymmetric waveguide type interferometer designed and constructed especially as an optical frequency-division multi/demultiplexer for an optical frequency-division multiplexing transmission system and FIG. 22B is a cross sectional view taken along line, A—A' in FIG. 22A at an enlarged scale. In FIGS. 22A and 22B, the same reference numerals are used to designate similar to those parts shown in FIG. 19A.

In FIGS. 22A and 22B, each of directional couplers 22 and 23 composed of silica glass and formed on the silicon substrate 1 comprises two silica single mode optical waveguides which are closely spaced, and the coupling factor between the two optical waveguides is determined to be about 50%. Two optical waveguides 24 and 25 interconnecting the directional couplers 22 and 23 are different in length by $\Delta L$.

In the Mach-Zehnder interferometer with the above-described construction, it is well known in the art that when an optical frequency of a signal light incident to the input port 21a is varied a signal light is alternately derived from the output ports 21b and 22b at a frequency of $$\Delta f = (c/2n) \cdot (1/\Delta L),$$

where c is the light velocity add n is the refractive index of the optical waveguide. Therefore, if, for instance, two signal lights $f_1$ and $f_2$ which are different in frequency by $\Delta f = 10$ GHz in the 1.55 $\mu$m band are incident simultaneously on the input port 21a and when $\Delta L \approx 10$ mm is determined in accordance with the above-described relation, the two signal lights $f_1$ and $f_2$ are separately derived from the output ports 21b and 22b, respectively. In practice, the above-described frequency interval of the Mach-Zehnder interferometer is synchronized with the frequency of the signal lights $f_1$ and $f_2$ and in order to derive a desired signal light from a desired output port, a phase shifter 71 in the form of a thin film heater is positioned above one optical waveguide 25 to vary the effective optical path of (the waveguide 25 by about one wavelength due to the thermal optical effect. The entire interferometer as shown in FIGS. 22A and 22B functions as a wave combining and splitting device for an optical frequency-division multiplexing communication system.

However, the waveguide type interferometer of the type described above has the following problems. That is, since the silicon substrate 1 and the optical waveguides 24 and 25 formed thereon are different in thermal expansion coefficient, the optical waveguides receive a compression stress in the direction in parallel with the silicon substrate 1, so that birefringence,is induced by the compression stress. Accordingly, the effective refractive index n is varied slightly in accordance with the direction of polarization of the incident light. Therefore, there arises a problem that the waveguide type interferometer will never function as an optical frequency-division multi/demultiplexer, unless the direction of polarization of the incident light is determined to be either normal (TM) or parallel (TE) to the substrate surface.

Therefore, the present embodiment provides a waveguide type Mach-Zehnder interferometer which can substantially overcome the problems encountered in the conventional waveguide type interferometer and which is free from the direction of polarization of the input light.

In order to overcome the above problems, first it may be considered to completely eliminate birefringence in the optical waveguide, but from the standpoint of fabrication techniques available at present, it is extremely difficult to eliminate birefringence in the optical waveguide formed on a planar substrate. On the other hand, according to the present embodiment, the dependence of the Mach-Zehnder interferometer on polarization is effectively eliminated, while admitting the existence of birefringence in an optical waveguide.

When the difference in effective refractive index between a TM wave having a polarization direction perpendicular to the substrate 1 ad a TE wave having a polarization direction in parallel with the substrate 1 is defined as a birefringence value B, a polarization-sensitive optical path difference R between the optical waveguides 24 and 25 (FIGS. 22A and 22B) is given by the following equation:

$$R = \int Bdl_1 - \int Bdl_2 \qquad (1),$$

where $l_1$ and $l_2$ are linear coordinates along the optical waveguides 24 and 25, respectively, and $\int Bdl_1$ and $\int Bdl_2$ are linearly integrated values, respectively, of the values B along the respective optical waveguides. Each of the integrations is made from the directional coupler 22 to the directional coupler 23.

In this embodiment, the value B is locally adjusted so that R becomes a multiple (including 0) of the wavelength of light used. That is, since the optical phase difference between multiples of the light wavelength $\lambda$ cannot be detected by the Mach-Zehnder interferometer, the fact that the interference conditions of the TM wave apparently coincide with those of the TE wave is taken into consideration in the present embodiment. In practice, local adjustment of the value B is accomplished by forming stress adjusting relief on both sides of at least one optical waveguide.

Since the embodiment is designed and constructed based on the above-described principles, the problem encountered in the conventional Mach-Zehnder interferometer that the conditions for separating the TM waves are different from those for separating the TE waves are substantially overcome. Under the same conditions for driving a thin film heater phase shifter, the Mach-Zehnder interferometer of the present embodiment can realize an optical frequency-division multi/demultiplexer accomplishing the same operation regardless of the polarization state of the incident light.

Figure 23A:
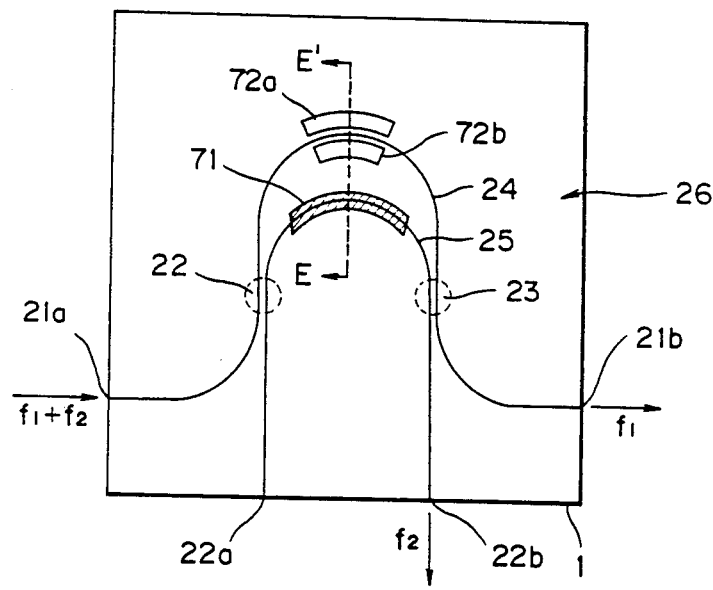
FIG. 23A is a plan view showing an embodiment of a waveguide type Mach-Zehnder interferometer in accordance with the present invention.
Figure 23B:
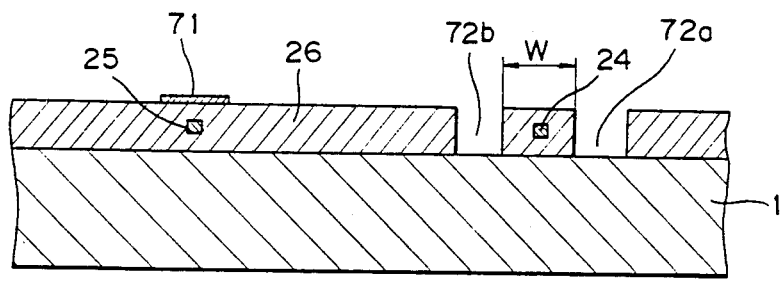
FIG. 23B is a sectional view taken along line E—E' in FIG. 23A.

FIG. 23A is a plan view of a waveguide type Mach-Zehnder interferometer based upon the above-described principles and FIG. 23B is a cross sectional view, on an enlarged scale, taken along line E—E' in FIG. 23A. The Mach-Zehnder interferometer in accordance with the present embodiment is different from the conventional Mach-Zehnder interferometer shown in FIGS. 22A and 22B in that stress relief grooves 72a and 72b are formed on both sides of a part of the optical waveguide 24 in order to locally vary the value of stress-induced birefringence.

In this embodiment, a silica glass cladding layer 26 having a thickness of 50 $\mu$m was formed on a silicon substrate 1 having a thickness of 0.7 mm. Two silica glass core portions were embedded or buried in the cladding layer 26 to form the optical waveguides 24 and 25. The optical waveguides 24 and 25 were closely disposed in such a way that an evanescent coupling could be established between the optical waveguides, thereby forming directional couplers 22 and 23 with a coupling coefficient of 50%.

The cross section of each of the optical waveguides 24 and 25 was about 6 μm×6 μm. The relative refractive-index difference between the optical waveguide 24 or 25 and the cladding layer 26 was 0.75%. The curved portions of the optical waveguides 24 and 25 are defined by a radius of curvature of about 5 mm. This silica single mode optical waveguides can be fabricated by a conventional process in which a deposition process for depositing a glass film by flame hydrolysis of raw material gases such as $SiCl_4$, $TiCl_4$ or the like is combined with a reactive ion etching technique. The stress relief grooves 72a and 72b are formed by removing predetermined portions of the cladding layer 26 on both sides of the core portion of the optical waveguide 24 by a reactive ion etching process. These stress relief grooves 72a and 72b which are formed on both sides of the optical waveguide 24 function to relax a compressive stress which the optical waveguide 24 receives from the substrate 1 in the widthwise direction of the optical waveguide 24. When the length of a region of the optical waveguide 24 where the stress relief grooves 72a and 72b are formed is $l_{12}$, the difference in the optical path R between the two optical waveguides which is dependent upon the direction of polarization as shown in Equation (1) becomes $$R = B \Delta L - (B - B^*) l_{12} \qquad (2),$$

where ΔL is the difference in length between the optical waveguides and was 10 mm in this embodiment; B is the value of birefringence of a region of the optical waveguide 24 along which no stress relief groove is formed and $B \simeq 4 \times 10^{-4}$; and $B^*$ is the value of birefringence of a region of the optical waveguide 24 in which the stress relief grooves 72a and 72b are formed. $B^*$ is dependent upon the width W (FIG. 23B) of the cladding layer interposed between the stress relief grooves 72a and 72b and $W \simeq 150$ μm in this embodiment, so that the value of birefringence is reduced to 50% and consequently $B^* \simeq 2 \times 10^{-4}$. In general, the value $B^*$ is decreased with a decrease in W.

If the birefringence nature of the interferometer is so designed and constructed that R is an integer multiple of a wave length λ as described above, the dependence on the direction of polarization of incident light can be eliminated. In this embodiment, $l_{12} \simeq 12.3$ mm is determined when $B \simeq 4 \times 10^{-4}$; $B^* \simeq 2 \times 10^{-4}$; and $\Delta L \simeq 10$ mm = $10^4$ μm. Then, from Equation (2), $R \simeq 1.55$ μm; that is, R can be adjusted to be one time the optical wavelength used.

It was actually confirmed that the Mach-Zehnder interferometer designed and constructed with the above-described values functions as an optical frequency-division multi/demultiplexer in a stable manner regardless of the direction of polarization of the incident light.

It is to be understood that the present invention is not limited to the above-described combination of $B^*$ and $l_{12}$ and that it is possible to use various combinations as long as Equation (1) or (2) is satisfied. For instance, when W is determined to be about 90 μm, $B^* \simeq 1 \times 10^{-4}$. In this case, if $l_{12} \simeq 13.3$ mm, then R≈0 is obtained. That is, it is possible to adjust R to be 0 times the wavelength of light used so that the dependence on the direction of polarization of the incident light is eliminated.

Embodiment 22

Figure 24:
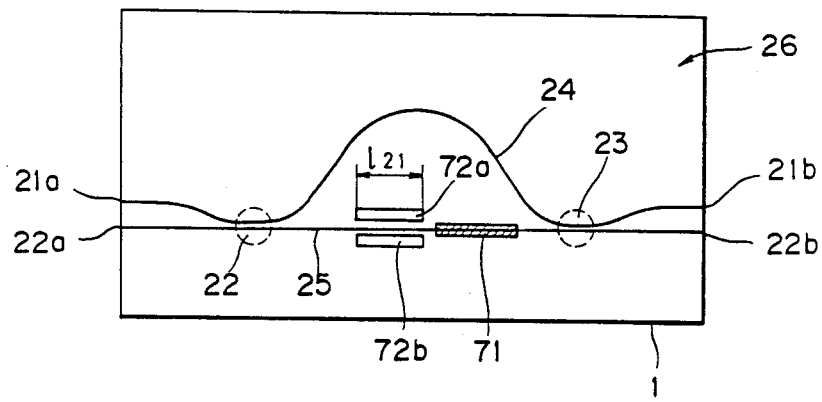
FIG. 24 is a plan view showing a modification thereof.

FIG. 24 shows a further embodiment of a Mach-Zehnder interferometer embodying optical waveguides in accordance with the present invention. As in the case of embodiment 21, the silica single mode optical waveguides 24 and 25 formed on the silicon substrate 1 couple the directional couplers 22 and 23, so that an asymmetric type Mach-Zehnder interferometer (in which a difference in optical path $\Delta L \simeq 5$ mm) is provided. Unlike embodiment 21, the stress relief grooves 72a and 72b are formed on both sides of a portion of the shorter optical waveguide 25 having a length of $l_{21}$. In this case, R given by Equation (1) is expressed by the following equation (3):

$$R = B \cdot \Delta L + (B - B^*) l_{21} \qquad (3)$$

When $\Delta L \simeq 5$ mm; $B \simeq 4 \times 10^{-4}$; $B^* \simeq 2 \times 10^{-4}$; and $l_{21} = 5.5$ mm, then $R = 3.1$ μm = 1.55 μm × 2. That is, the dependence of the Mach-Zehnder interferometer on the direction of polarization of incident light was substantially eliminated by adjusting the difference in optical path R to be two times the wavelength 1.55 μm.

In either of the embodiments 21 and 22, the thin film heater phase shifter 71 is provided to vary the difference ΔL in optical path between the two optical waveguides by about one wavelength in accordance with the frequency of the signal light, so that the frequency separation of the Mach-Zehnder interferometer is synchronized with two frequencies of signal lights. Therefore, the phase shifter 71 may be disposed on the optical waveguide 24 instead of the optical waveguide 25.

The function of the thin film heater phase shifter 71 is based upon the principle of thermooptical effect and its phase shift function is isotropic. That is, the phase shifter 71 affects both TE and TM waves in a substantially similar manner, so that there is no problem that polarization sensitivity will occur in the phase shifter 71.

In both of embodiments 21 and 22, the directional couplers 22 and 23 are used as an optical coupler constituting an interferometer, but it is to be understood that the Mach-Zehnder interferometer in which a Y-shaped branching-combining element is used instead of the directional coupler is within the scope of the present invention.

Furthermore, in the above-mentioned embodiments, the depth of the stress relief groove 72a or 72b corresponds to the thickness of the cladding layer 26, but it is to be understood that the present invention is not limited to the above-described groove structure and that the depth may not be equal to the thickness of the cladding layer 26. In general, the deeper the depth of the groove, the further the value $B^*$ decreases.

As described above, in embodiments 21 and 22 of the present invention, the birefringence value of each of the two single mode optical waveguides 24 and 25 which constitute the Mach-Zehnder interferometer is locally varied in a portion of the optical waveguide having a predetermined length of the function of the stress relief grooves 72a and 72b, so that the dependence of the interferometer on the direction of polarization of light can be substantially eliminated and consequently the present invention has an advantage that the interferometer which is stable in operation independently of the direction of polarization of the incident light can be realized. That is, the present invention can provide an optical frequency-division multiplexing circuit or an interferometer type optical sensor without using an additional optical device such as a polarization plane controller or the like.

Embodiment 23

It is possible to use the optical waveguide in accordance with the present invention to construct a waveguide type optical phase shift plate for controlling the type of polarization of signal light in the field of optical communication or in an optical sensor. In the technical field of optical communication or optical sensing, an optical element called a phase shift plate such as a quarterwave plate or half-wave plate for controlling the plane of polarization of signal light has been widely used and so far a birefringence type crystal plate has been used as a phaseshift plate.

Figure 25:
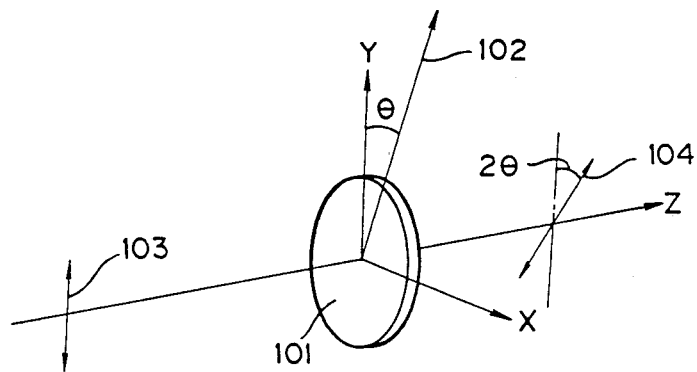
FIG. 25 is an explanatory diagram used to explain a conventional bulk type optical phase plate (a half-wave plate)

FIG. 25 shows one example of a conventional phase plate, which is called a half wave plate. When a linearly polarized light beam 103 is incident to a birefringence type crystal plate 101 at an inclined angle $\theta$ with respect to the principal axis 102 of birefringence, the incident light beam 103 is splitted into two polarized components in the direction of the principal axis 102 and the direction perpendicular thereto, while the phase of one light beam lags behind the phase of the other light beam. From the crystal plate 101, a light beam which consists of a combination of the two light beams and whose polarization is dependent upon the polarization states of the two light beams is emitted. The lag in phase is referred to as retardation and is represented by R. The value of R is given by B·l, where B is the birefringence value and l is the thickness of the phase plate 101, and in general is expressed in terms of a unit of wavelength. A phase plate which causes a retardation of one half of wavelength $\lambda$ is called a half-wave plate. It is well known to those skilled in that art that a linearly polarized light incident on a half-wave plate is emitted as a linearly polarized light 104 inclined by an angle $2\theta$ with respect to the polarization direction of the incident light beam 103.

However, in the optical system shown in FIG. 25, a lens system is required so that the incident light beam 103 is made incident perpendicularly to the crystal plate 101. Accordingly, it is difficult to make an optical system incorporating therein a phase plate compact in size. In addition, there arises a problem that it is not ensured that a light waves is transmitted in space in a stable manner.

On the other hand, recent technical developments of optical devices for use in an optical communication system and an optical sensor have been concentrated to making such optical devices compact in size, highly reliable and durable in operation and inexpensive. Therefore, there is a strong tendency to design and construct waveguide type optical components and optical integrated circuits which in general are based upon an optical waveguide formed on a planar substrate instead of a so-called bulk type optical components in which a lens system and a prism are combined. Especially, when matching of an optical component with an optical fiber is taken into consideration, various practical advantages can be attained when a silica optical waveguide composed of the same materials as the optical fiber is used as the optical waveguide on the planar substrate.

FIG. 1 shows in cross section one example of a structure of such a silica single mode optical waveguide of the type described above. The optical waveguide is formed by the silicon substrate 1, the cladding layer 3 formed on the silicon substrate 1 and the core portion 2 embedded or buried in the cladding layer 3. The cladding layer 3 is about 50 $\mu$m in thickness and the size of the cross section of the core portion 2 is about 6–12 $\mu$m in accordance with the core diameter of a single mode optical fiber. In this optical waveguide, the signal light is confined within the core portion 2 and is propagated above the silicon substrate 1, so that when the structure of the optical waveguide is suitably selected, it is possible to attain optical circuit functions such as branching and combining a light beam.

In the optical waveguide shown in FIG. 1, due to a difference in thermal expansion coefficient between the silica glass optical waveguide and the silicon substrate 1, a compressive stress is produced in the core portion 2 in parallel with the direction of the major surface of the silicon substrate 1, so that the optical waveguide exhibits birefringence due to the optical elastic effect. In the optical waveguide of the type described above, it is well known to those skilled in the art that there exist two directions of the principal axes of birefringence, i.e., one being in the direction perpendicular to the major surface of the substrate 1 and the other being in the direction in parallel therewith. A linearly polarized light beam incident in parallel with the directions of the two principal axes of birefringence propagates along the core portion 2 of the optical waveguide, while the polarization direction is maintained. In contrast in the prior art optical waveguide having the construction as shown in FIG. 1, it is difficult to have a function of a half-wave plate for rotating the direction of polarization in the optical waveguide. The reason is that in the prior art optical waveguide structure, the directions of the axes of birefringence are limited to the two directions; i.e., the direction which is perpendicular to the major surface of the substrate and the direction which is in parallel therewith.

This embodiment provides a waveguide type optical phase plate which can substantially overcome the above-described problems by using the optical waveguide in accordance with the present invention.

In this embodiment, a stress relief groove is formed in a predetermined portion of a cladding layer adjacent to a core portion of an optical waveguide, so that the directions of the principal axes of birefringence are inclined from the direction perpendicular to the major surface of a substrate and from the direction in parallel therewith, whereby this embodiment substantially functions as a birefringence type crystal plate. An optical phase plate in accordance with this embodiment constitutes a waveguide type phase plate, instead of a bulk-type phase plateand is therefore different from the prior art in that the phase plate can be continuously incorporated in a predetermined portion of an optical waveguide.

Figure 26:
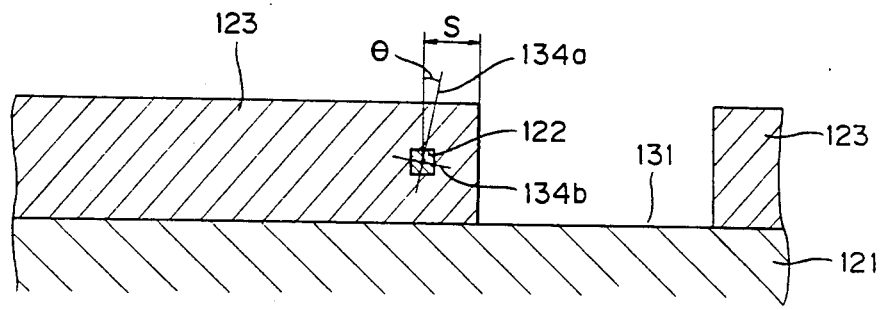
FIG. 26 is a sectional view showing an embodiment of an optical phase plate in accordance with the present invention.

FIG. 26 shows a fundamental construction of embodiment 23 in accordance with the present invention, in which reference numeral 121 denotes a silicon substrate; 122, a silica glass single mode core portion; 123, a cladding layer; and 131, a groove formed in the cladding layer 123 along one side of the core portion 122.

The inventors found that a part of a stress applied from the silicon substrate 121 to the optical waveguide is relieved by the groove 131, so that the symmetry with respect to the core portion 122 is no longer attained and consequently the principal axes 134a and 134b of birefringence are inclined by an angle $\theta$ as compared with an optical waveguide without a groove. Therefore, the optical waveguide in which the stress relief groove 131 is provided on one side of and along the core portion 122 can accomplish the same function as the birefringence crystal plate shown in FIG. 25.

The angle $\theta$ of inclination is mainly dependent upon the thickness of the cladding layer 123, the height of the core portion 122 and the spacing S between the core portion 122 and the stress relief groove 131.

Figure 27:
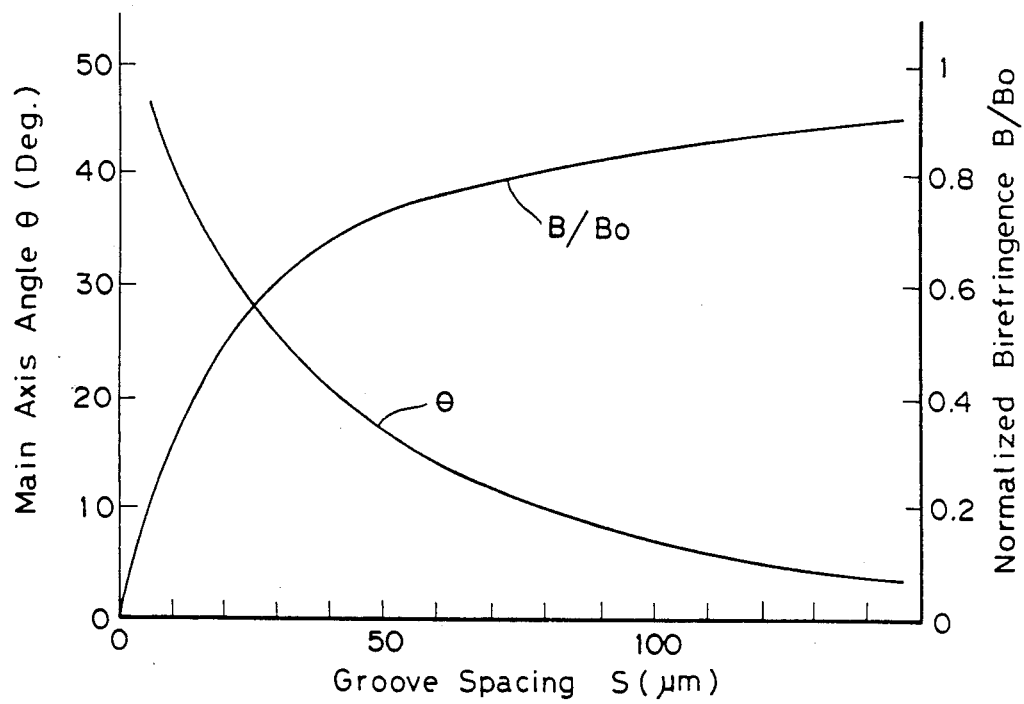
FIG. 27 is an explanatory diagram used to explain operation of a stress relief groove thereof.

FIG. 27 is an example of a curve illustrating the relationship between the angle $\theta$ of the principal axis and the spacing S between the core portion 122 and the stress relief groove 131. The results calculated by the finite element method were plotted in FIG. 27. Here, it was assumed that the cladding layer 123 is 50 $\mu$m in thickness and the height of the center of the core portion 122 from the major surface of the substrate 121 is 25 $\mu$m. It was found that the lesser the spacing S, the greater the principal axis angle $\theta$ becomes.

FIG. 27 further illustrates the birefringence value B; that is, the difference in refractive indexes between the direction of the principal axis 134a and the direction of the principal axis 134b. In FIG. 27, the B value is normalized by a birefringence value Bo obtained when no stress relief groove 131 is provided; that is, when $S = \infty$. The value of Bo is more or less varied in accordance with the composition of silica glass which constitutes the optical waveguide. In general, the value of Bo is of the order of about $4 \times 10^{-4}$.

Embodiment 24

Figure 28:
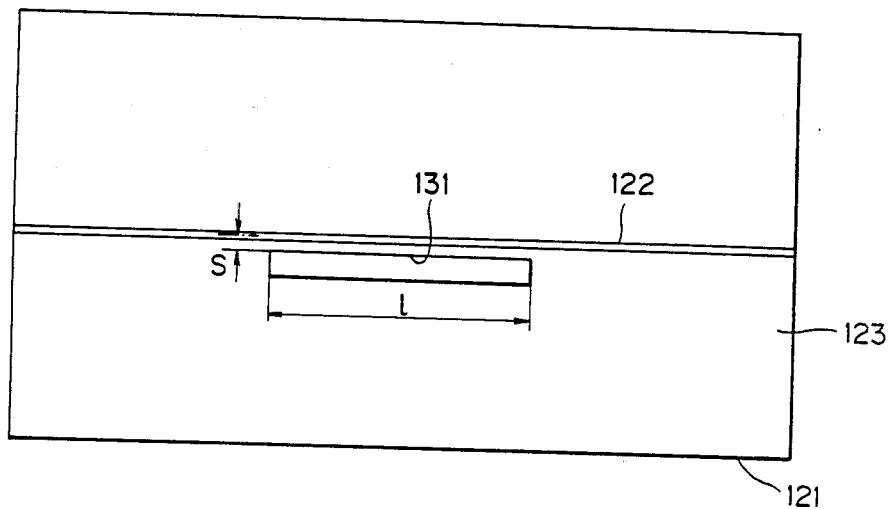
FIGS. 28 and 29 are plan views showing two embodiments, respectively, of an optical phase plate in accordance with the present invention.

FIG. 28 is a plan view showing this embodiment of a half-wave plate embodying the present invention. On the silicon substrate 121 having a thickness of 0.7 mm, the silica glass cladding layer 123 is formed. The cladding layer 123 is 50 $\mu$m in thickness. The core portion 122 is embedded or buried in the cladding layer 123 and the stress relief groove 131 is formed in the cladding layer 123 adjacent to the core portion 122. The cross section of the core portion 122 was 8 $\mu$m × 8 $\mu$m and a relative refractive-index difference between the core portion 122 and the cladding layer 123 was 0.25%. The spacing S was selected to be almost equal to 35 $\mu$m based on the relationship shown in FIG. 27, so that an angle $\theta$ of the principal axis was 22.5°. The width of the stress relief groove 131 was of the order of 200 $\mu$m. Under these conditions, B/Bo≃0.63, so that B≃2.5×10$^{-4}$ because Bo≃4×10$^{-4}$ and a birefringence whose inclined angle of principal axis $\theta$ was 22.5° was obtained. The length l of the stress relief groove 131 was so selected as to satisfy B·l=½λ. That is, l=2.6 mm, since the wavelength λ of the wavelength of light used was 1.3 $\mu$m.

The structure of the optical waveguide with the stress relief groove of the type described above can be fabricated by a conventional fabrication process in which a glass film deposition technique by flame hydrolysis of glass forming raw material such as SiCl$_4$, TiCl$_4$ or the like is combined with a dry etching process of which a reactive ion etching process is a most typical example.

When a light beam (TM wave) linearly polarized in a direction perpendicular to the major surface of the substrate 121 was incident to the leftward end of the core portion 122, it was confirmed that the polarization plane of the linearly polarized light beam was rotated by $2\theta = 45°$, when the light beam passed through the portion in which the stress relief groove 131 was provided; that is, the waveguide type half-wave plate portion. Thereafter, the polarized light beam passed through the usual optical waveguide portion in which no stress relief groove 131 was formed. Thus, it was observed that the light beam passed through the core portion 122, while repeatedly alternating the circular polarization and the linear polarization at a frequency equal to a beat length determined by the birefringence value Bo. It was, therefore, confirmed that the portion in which the stress relief groove 131 was provided functioned as a half-wave plate.

Embodiment 25

Figure 29:
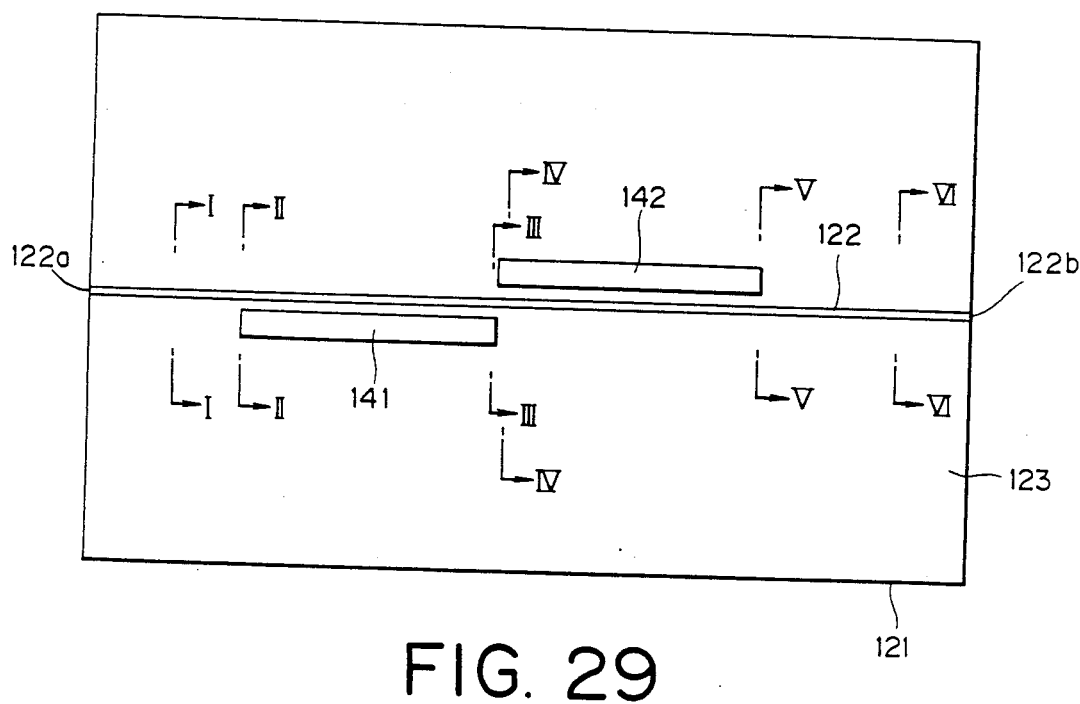

FIG. 29 shows embodiment 25 of the present invention which is different from embodiment 24 described above with reference to FIG. 28 in that two stress relief grooves 141 and 142 are disposed on both sides of the core portion 122 alternately in the longitudinal direction thereof. Both of the stress relief grooves 141 and 142 have the same dimensions S and l as those in embodiment 24.

The linearly polarized light beam (TM wave) which is incident to the core portion 122 from its input end 122a and which is perpendicular to the major surface of the substrate 1 becomes the linear polarized light beam whose plane of polarization is inclined by 45° when it passes through the region along which the stress relief groove 141 is provided. Then, the plane of polarization is further inclined by 45° when the light beam passes through the region along which the stress relief groove 142 is provided. It was confirmed that finally the light beam (TE wave) in parallel with the major surface of the substrate 121 was derived from the output end 122b of the core portion 122. On the other hand, it was also confirmed that when the TE wave was incident to the input end 122a, the TM wave was derived from the output end 122b. Thus, it was confirmed that this embodiment shown in FIG. 29 functions as a TE/TM mode converter.

The process of such TE/TM mode conversion will be described in more detail with reference to FIGS. 30A-30F which are cross sectional views taken along lines I—I, II—II, III—III, IV—IV, V—V and VI—VI, respectively, in FIG. 29. In FIGS. 30A-30F, the broken lines represent the direction of the principal axis of the optical waveguide and the solid lines with the arrows at both ends thereof indicate the direction of polarization.

Figure 30A:
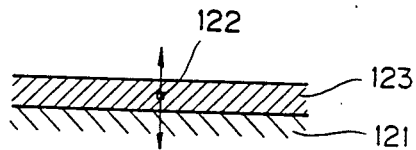
FIGS. 30A–30F are explanatory diagrams used to explain operation of the optical phase plate shown in FIG. 29.
Figure 30B:
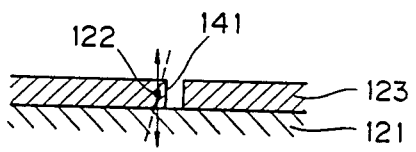
Figure 30C:
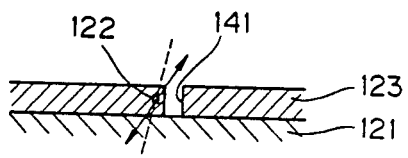
Figure 30D:
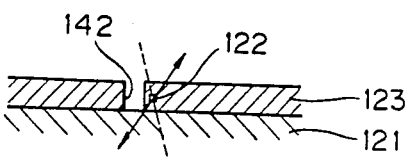
Figure 30E:
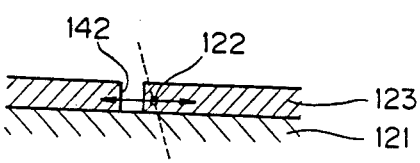
Figure 30F:
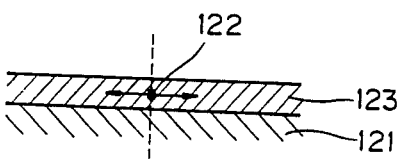

The linearly polarized light beam (TM wave) is incident to the core portion 122 from its leftward input end 122a (FIG. 30A) and then reaches the entrance of the stress relief groove 141 (FIG. 30B), while maintaining the TM wave mode (FIG. 30A). The stress relief groove region 141 has the direction of the principal axis of birefringence inclined by 22.5° with respect to the TM wave and the length of the stress relief groove 141 is so selected that the stress relief groove 141 functions as a half-wave plate. Consequently, the TM wave is converted into the linearly polarized light beam inclined by 22.5°×2=45° at the exit of the groove 141 (FIG. 30C).

At the entrance of the second stress relief groove 142 (FIG. 30D), the linearly polarized light beam and the principal axis of birefringence make an angle of 45°+22.5°=67.5°. At the exit of the groove 142 (FIG. 30E), the direction of polarization is changed by 67.5°×2=135° with crossing the principal axis of birefringence, so that the direction of polarization is changed by 135°−45°=90° with respect to the direction of polarization of the light beam shown in FIG. 30A and consequently the TE wave is derived from the region (FIG. 30F) indicated by the line VI—VI in FIG. 29. Thus, this embodiment of the present invention functions as a TE/TM mode converter.

While in embodiments 23-25, the half-wave plate and its combinations have been described, it is to be understood that the present invention is not limited to these embodiments and can provide various types of optical phase plates including quarter-wave plate or polarization plane control elements by suitably controlling the spacing S between the core portion and the stress relief groove, and the length l and the shape of the groove.

Embodiment 26

Figure 31:
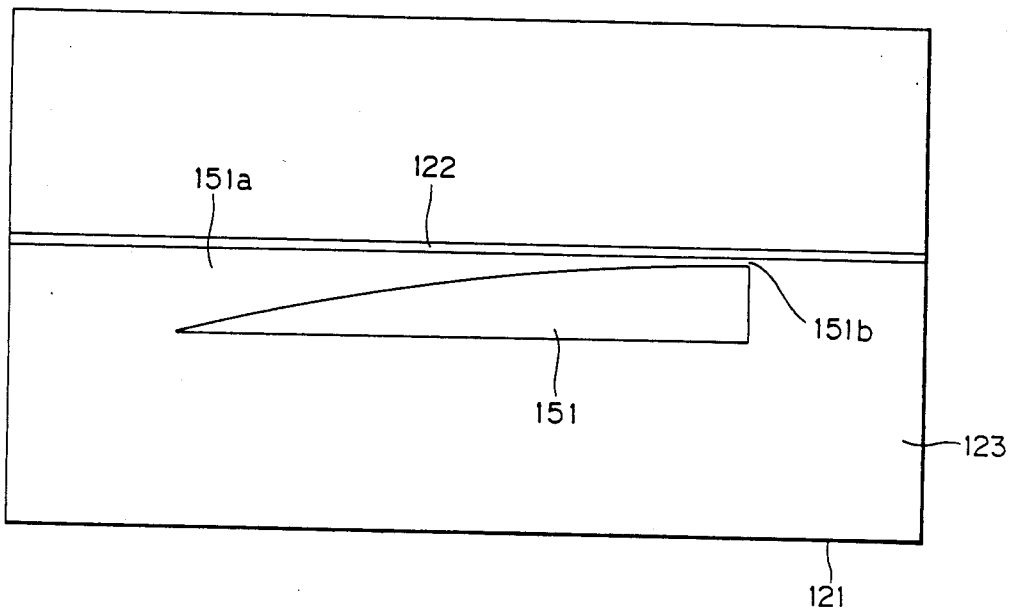
FIG. 31 is a plan view showing an embodiment of a stress relief groove.

FIG. 31 is a plan view showing embodiment 26 of the present invention. Here, reference numeral 151 denotes a stress relief groove. In this embodiment, the spacing between the stress relief groove 151 and the core portion 122 of the optical waveguide is gradually varied in the longitudinal direction of the core portion 122. Therefore, in a region 151a of the groove 151 in which the spacing S is greater, the principal axis of birefringence of the core portion 122 is perpendicular to (or in parallel with) the major surface of the substrate 121, but toward a region 151b of the groove 151 in which the spacing S becomes smaller, the principal axis of birefringence is gradually inclined. When a TM wave light beam propagates through the core portion 122 from its left end, this structure can gradually rotate the direction of polarization while maintaining the propagating light beam in the linearly polarized state. Therefore, this embodiment can be very advantageously utilized as means for controlling the plane of polarization.

In this case, the plane of polarization cannot follow a rapid change in an angle $\theta$ of the principal axis, and hence it is preferable that the distance from the region 151a to the region 151b is selected to be relatively longer, for instance, about 5 mm or longer.

When "a relatively longer distance" is determined, a so-called "beat length Lp" of an optical waveguide can be used as its measure. The beat length Lp, the light wavelength $\lambda$ and the birefringence value B of the optical waveguide have the following relationship:

$Lp = \lambda/B$.

For instance, when $\lambda = 1.3$ $\mu$m and $B = 4 \times 10^{-3}$, the beat length Lp is of the order of 3 mm. This is the reason why the distance between the region 151a and the region 151b must be selected to be longer than the beat length Lp.

Embodiment 27

Figure 32:
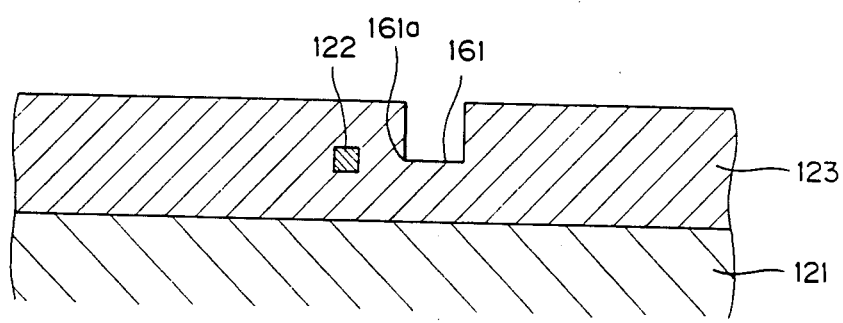
FIG. 32 is a sectional view showing another embodiment of a stress relief groove.

In either of the above-described embodiments, the bottom of the stress relief groove reaches the major surface of the substrate. In this embodiment, as shown in FIG. 32, a stress relief groove 161 may have a depth which is equal to a value within the thickness of the cladding layer 123, so that a strong stress-induced birefringence is produced from the corner portion 161a of the groove 161. This strong stress-induced birefringence may be employed to incline the principal axis of birefringence of the core portion 122.

While the present invention has been explained with reference to the above embodiments in which the silica single mode optical waveguide is formed on the silicon substrate, the present invention is not limited to the combination of the silicon substrate and the silica single mode optical waveguide. The present invention is applicable to various types of substrates or optical waveguides as long as the optical waveguide is subjected to stress-induced birefringence from the substrate.

As described above, according to the present embodiment, a stress relief groove or grooves are formed at a predetermined distance from and along an optical waveguide, so that it is possible to vary the principal axis of birefringence of the optical waveguide, which is fixed only in the direction perpendicular to or in parallel with the major surface of a planar substrate. As a result, the present embodiment can provide a waveguide type optical phase plate and an element for controlling the plane of polarization, which have an excellent degree of matching with a waveguide type optical component part or an optical integrated circuit. In addition, when an optical phase plate incorporating an optical waveguide in accordance with the present invention is applied to a single mode optical communication system, an optical sensor or an optical information processing system in which it is essentially required to control polarization, an optical device can be made compact in size, highly reliable and dependable in operation and inexpensive to fabricate.

What is claimed is:

1. An optical device comprising:
   a substrate;
   a cladding layer formed on said substrate;
   a silica glass core portion extending in a longitudinal direction formed in said cladding layer; and
   stress adjusting means extending in said longitudinal direction provided locally in said cladding layer in at least one portion in the vicinity of said core portion for adjusting the stress applied to said core portion, whereby the stress-induced birefringence is adjusted in said core portion.

2. A single-mode channel optical waveguide comprising:
   a substrate;
   a cladding layer formed on said substrate;
   a silica glass core portion extending in a longitudinal direction formed in said cladding layer; and
   stress adjusting means provided locally in said cladding layer in at least one portion in the vicinity of said core portion for adjusting the stress applied to said core portion, whereby the stress-induced birefringence is adjusted in said core portion.

3. A single-mode channel optical waveguide as claimed in claim 2, wherein said stress adjusting means comprises a member which applies a stress to said core portion.

4. A single-mode channel optical waveguide as claimed in claim 3, wherein said member is an elongated member embedded in said cladding layer, said elongated member being composed of a material having a thermal expansion coefficient different from that of said cladding layer.

5. A single-mode channel optical waveguide as claimed in claim 4, wherein said material is selected from the group consisting of silicon, silicon nitride and $B_2O_3$ doped silica glass.

6. A single-mode channel optical waveguide as claimed in claim 3, wherein said substrate is composed of a silicon.

7. A single-mode channel optical waveguide as claimed in claim 3, wherein said substrate is composed of silicon.

8. A single-mode channel optical waveguide as claimed in claim 2, wherein said stress adjusting means is a groove for relieving said stress.

9. A single-mode channel optical waveguide as claimed in claim 8, wherein said groove is located only in said cladding layer.

10. A single-mode channel optical waveguide as claimed in claim 8, wherein said substrate has a major surface on which said cladding layer is formed, and wherein said groove has such a depth that the bottom thereof reaches said major surface.

11. A single-mode channel optical waveguide as claimed in claim 8, wherein said substrate is a silica substrate.

12. A single-mode channel optical waveguide as claimed in claim 8, wherein said substrate is made of silicon.

13. A single-mode channel optical waveguide as claimed in claim 12, wherein said substrate has a major surface on which said cladding layer is formed, and wherein one portion of said optical waveguide constituted by said core portion which is surrounded by said cladding layer is separated from said major surface.

14. A single-mode channel optical waveguide as claimed in claim 13, wherein the portion of said cladding layer corresponding to said one portion of said optical waveguide is removed to form at least one pair of grooves, and a portion of said silica substrate corresponding to said one portion of said optical waveguide is removed to form a recess communicating with said at least one pair of grooves.

15. A single-mode channel optical waveguide as claimed in claim 14, wherein a plurality of pairs of groove are provided through bridge structures in said recess in the longitudinal direction of said core portion.

16. A single-mode channel optical waveguide as claimed in claim 14, wherein a portion of said one portion of said optical waveguide corresponding to one end of said at least one pair of grooves is cut out to form a separation groove communicating with said recess and said at least one pair of grooves.

17. A single-mode channel optical waveguide as claimed in claim 14, wherein said substrate is made of silicon and said recess is formed by selectively etching through said at least one pair of grooves.

18. A single-mode channel optical waveguide as claimed in claim 13, wherein a portion of said cladding layer corresponding to said one portion of said optical waveguide is removed to form a plurality of pairs of grooves in the longitudinal direction of said core portion, and wherein a portion of said silicon substrate corresponding to said one portion of said optical waveguide is removed to form a plurality of recesses which communicate with said plurality of pairs of groove in the longitudinal direction of said core portion.

19. A single-mode channel optical waveguide as claimed in claim 18, wherein said substrate is made of silicon and said recess is formed by selectively etching through said at least one pair of grooves.

20. A waveguide type Mach-Zehnder interferometer comprising:
two optical couplers;
two optical waveguides having different lengths and exhibiting stress-induced birefringence, said two optical waveguides coupling said two optical couplers, respectively;
stress relief grooves disposed along and on both sides of at least one optical waveguide in such a way that a difference in values obtained by line integration of a birefringence value with respect to each of said at least one optical waveguide between said two optical couplers is substantially equal to an integer multiple of a wavelength of light used.

21. A waveguide type Mach-Zehnder interferometer as claimed in claim 20, wherein each of said optical waveguides is a single mode optical waveguide comprising a silicon substrate, a silica cladding layer disposed on said silicon substrate and a core portion embedded in said cladding layer and said stress relief groove is provided along said core portion.

22. A waveguide type Mach-Zehnder interferometer as claimed in claim 20, wherein a phase shifter for varying an effective optical path length of one of said two optical waveguides is disposed on said one of said two optical waveguides.

23. A waveguide type Mach-Zehnder interferometer as claimed in claim 22, wherein said phase shifter comprises a thin film heater.

24. A waveguide type Mach-Zehnder interferometer as claimed in claim 22, wherein said phase shifter and said stress relief grooves are disposed along the same optical waveguide.

25. A waveguide type Mach-Zehnder interferometer as claimed in claim 22, wherein said phase shifter and said stress relief grooves are disposed along the different optical waveguides.

26. A waveguide type optical phase plate comprising:
a single mode optical waveguide having a substrate, a cladding layer formed on said substrate and a core portion embedded in said cladding layer; and
at least one stress adjusting member disposed along said core portion by a predetermined length in at least one portion of said cladding layer in such a way that the principal axes of birefringence of said optical waveguide are inclined with respect to the direction perpendicular to or in parallel with the major surface of said substrate.

27. A waveguide type optical phase plate as claimed in claim 26, wherein said stress adjusting member is a stress relief groove.

28. A waveguide type optical phase plate as claimed in claim 27, wherein said substrate is made of silicon and said single mode optical waveguide is made of silica.

29. A waveguide type optical phase plate as claimed in claim 27, wherein a plurality of stress relief grooves are sequentially disposed along said core portion and alternately on both sides of said core portion.

30. A waveguide type optical phase plate as claimed in claim 27, wherein said core portion extends in a longitudinal direction, and wherein the spacing between said stress relief groove and said core portion is varied in the longitudinal direction of said core portion.

31. A waveguide type optical phase plate as claimed in claim 27, wherein the depth of said stress relief groove is equal to the thickness of said cladding layer.

32. A waveguide type optical phase plate as claimed in claim 27, wherein the depth of said stress relief groove is less than the thickness of said cladding layer.

* * * * *